US008683083B2

(12) United States Patent
Bubb et al.

(10) Patent No.: US 8,683,083 B2
(45) Date of Patent: *Mar. 25, 2014

(54) FIBRE CHANNEL INPUT/OUTPUT DATA ROUTING SYSTEM AND METHOD

(71) Applicant: International Business Machines Corporation, Armonk, NY (US)

(72) Inventors: Clinton E. Bubb, Pleasant Valley, NY (US); Daniel F. Casper, Poughkeepsie, NY (US); John R. Flanagan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/657,036

(22) Filed: Oct. 22, 2012

(65) Prior Publication Data

US 2013/0046905 A1 Feb. 21, 2013

Related U.S. Application Data

(63) Continuation of application No. 13/150,530, filed on Jun. 1, 2011.

(51) Int. Cl.
*G06F 3/00* (2006.01)
*G06F 5/00* (2006.01)
*G06F 13/00* (2006.01)

(52) U.S. Cl.
USPC .................................. 710/4; 710/33; 710/39

(58) Field of Classification Search
None
See application file for complete search history.

(56) References Cited

U.S. PATENT DOCUMENTS

| 3,693,161 A | 9/1972 | Price et al. |
| 3,943,283 A | 3/1976 | Caragliano et al. |
| 4,004,277 A | 1/1977 | Gavril |
| 4,080,649 A | 3/1978 | Calle et al. |

(Continued)

FOREIGN PATENT DOCUMENTS

| DE | 3931514 | 3/1990 |
| GB | 1264096 | 2/1972 |

(Continued)

OTHER PUBLICATIONS

URL, http://en.wikipedia.org/wiki/FICON, FICON, Wikipedia, USA, Wikimedia Foundation, Inc., Aug. 9, 2011.

(Continued)

*Primary Examiner* — Zachary K Huson
(74) *Attorney, Agent, or Firm* — Cantor Colburn LLP; Steven Chiu

(57) ABSTRACT

A method of performing an input/output (I/O) processing operation includes obtaining information relating to an I/O operation at a channel subsystem in the host computer system, the channel subsystem including at least one channel having a channel processor and a local channel memory, generating addressing information and forwarding the addressing information to a network interface between the channel subsystem and at least one I/O device, the addressing information specifying a location in the local channel memory. The method also includes forwarding an I/O command message to the at least one I/O device via the network interface, receiving a data transfer request from the network interface that includes the addressing information, accessing one of a plurality of address control words (ACWs), each ACW specifying an address of a location in a host computer memory, and routing the data transfer request to the host memory location specified in the ACW.

8 Claims, 15 Drawing Sheets

(56) References Cited

U.S. PATENT DOCUMENTS

| | | |
|---|---|---|
| 4,207,609 A | 6/1980 | Luiz et al. |
| 4,374,415 A | 2/1983 | Cormier et al. |
| 4,380,046 A | 4/1983 | Frosch et al. |
| 4,414,644 A | 11/1983 | Tayler |
| 4,455,605 A | 6/1984 | Cormier et al. |
| 4,497,022 A | 1/1985 | Cormier et al. |
| 4,564,903 A | 1/1986 | Guyette et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,843,541 A | 6/1989 | Bean et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |
| 5,040,108 A | 8/1991 | Kanazawa |
| 5,170,472 A | 12/1992 | Cwiakala et al. |
| 5,185,736 A | 2/1993 | Tyrrell et al. |
| 5,237,325 A | 8/1993 | Klein et al. |
| 5,265,240 A | 11/1993 | Galbraith et al. |
| 5,297,262 A | 3/1994 | Cox et al. |
| 5,301,323 A | 4/1994 | Maeurer et al. |
| 5,317,739 A | 5/1994 | Elko et al. |
| 5,325,492 A | 6/1994 | Bonevento et al. |
| 5,386,512 A | 1/1995 | Crisman et al. |
| 5,388,219 A | 2/1995 | Chan et al. |
| 5,410,727 A | 4/1995 | Jaffe et al. |
| 5,414,851 A | 5/1995 | Brice, Jr. et al. |
| 5,434,980 A | 7/1995 | Casper et al. |
| 5,440,729 A | 8/1995 | Kimura et al. |
| 5,452,455 A | 9/1995 | Brown et al. |
| 5,461,721 A | 10/1995 | Cormier et al. |
| 5,465,359 A | 11/1995 | Allen et al. |
| 5,500,942 A | 3/1996 | Eickemeyer et al. |
| 5,517,670 A | 5/1996 | Allen et al. |
| 5,526,484 A | 6/1996 | Casper et al. |
| 5,528,755 A | 6/1996 | Beardsley et al. |
| 5,539,918 A | 7/1996 | Allen et al. |
| 5,546,533 A | 8/1996 | Koyama |
| 5,548,791 A | 8/1996 | Casper et al. |
| 5,561,809 A | 10/1996 | Elko et al. |
| 5,564,040 A | 10/1996 | Kubala |
| 5,568,648 A | 10/1996 | Coscarella et al. |
| 5,584,039 A | 12/1996 | Johnson et al. |
| 5,600,793 A | 2/1997 | Nord |
| 5,600,805 A | 2/1997 | Fredericks et al. |
| 5,613,163 A | 3/1997 | Marron et al. |
| 5,640,600 A | 6/1997 | Satoh et al. |
| 5,640,603 A | 6/1997 | Meritt et al. |
| 5,644,712 A | 7/1997 | Coscarella et al. |
| 5,671,441 A | 9/1997 | Glassen et al. |
| 5,680,580 A | 10/1997 | Beardsley et al. |
| 5,758,190 A | 5/1998 | Johnson et al. |
| 5,768,620 A | 6/1998 | Johnson et al. |
| 5,787,071 A | 7/1998 | Basso et al. |
| 5,793,983 A | 8/1998 | Albert et al. |
| 5,812,877 A | 9/1998 | Young |
| 5,831,985 A | 11/1998 | Sandorfi |
| 5,845,146 A | 12/1998 | Onodera |
| 5,860,022 A | 1/1999 | Kondou et al. |
| 5,894,583 A | 4/1999 | Johnson et al. |
| 5,901,327 A | 5/1999 | Ofek |
| 5,907,684 A | 5/1999 | Halma et al. |
| 5,918,028 A | 6/1999 | Silverthorn et al. |
| 5,996,026 A | 11/1999 | Onodera et al. |
| 6,125,399 A | 9/2000 | Hamilton |
| 6,125,411 A | 9/2000 | Sato |
| 6,195,330 B1 | 2/2001 | Sawey et al. |
| 6,230,218 B1 | 5/2001 | Casper et al. |
| 6,249,787 B1 | 6/2001 | Schleimer et al. |
| 6,263,380 B1 | 7/2001 | Tsuboi et al. |
| 6,338,105 B1 | 1/2002 | Niizuma et al. |
| 6,343,335 B1 | 1/2002 | Dahman et al. |
| 6,347,334 B1 | 2/2002 | Fredericks et al. |
| 6,351,779 B1 | 2/2002 | Berg et al. |
| 6,353,612 B1 | 3/2002 | Zhu et al. |
| 6,401,223 B1 | 6/2002 | DePenning |
| 6,460,087 B1 | 10/2002 | Saito et al. |
| 6,466,590 B1 | 10/2002 | Park et al. |
| 6,484,217 B1 | 11/2002 | Fuente et al. |
| 6,546,435 B1 | 4/2003 | Yoshimura et al. |
| 6,584,511 B1 | 6/2003 | Marsh, III et al. |
| 6,594,785 B1 | 7/2003 | Gilbertson et al. |
| 6,609,161 B1 | 8/2003 | Young |
| 6,609,165 B1 | 8/2003 | Frazier |
| 6,647,016 B1 | 11/2003 | Isoda et al. |
| 6,651,125 B2 | 11/2003 | Maergner et al. |
| 6,658,603 B1 | 12/2003 | Ward |
| 6,687,766 B1 | 2/2004 | Casper et al. |
| 6,693,880 B2 | 2/2004 | Gregg et al. |
| 6,694,390 B1 | 2/2004 | Bogin et al. |
| 6,751,680 B2 | 6/2004 | Langerman et al. |
| 6,751,683 B1 | 6/2004 | Johnson et al. |
| 6,769,009 B1 | 7/2004 | Reisman |
| 6,772,207 B1 | 8/2004 | Dorn et al. |
| 6,826,661 B2 | 11/2004 | Umbehocker et al. |
| 6,839,773 B2 | 1/2005 | Vishlitzky et al. |
| 6,862,322 B1 | 3/2005 | Ewen et al. |
| 6,898,202 B2 | 5/2005 | Gallagher et al. |
| 6,915,378 B2 | 7/2005 | Roberti |
| 6,950,888 B1 | 9/2005 | Rooney et al. |
| 7,000,036 B2 | 2/2006 | Carlson et al. |
| 7,003,700 B2 | 2/2006 | Elko et al. |
| 7,020,810 B2 | 3/2006 | Holman |
| 7,035,540 B2 | 4/2006 | Finan et al. |
| 7,058,735 B2 | 6/2006 | Spencer |
| 7,085,860 B2 | 8/2006 | Dugan et al. |
| 7,100,096 B2 | 8/2006 | Webb, Jr. et al. |
| 7,111,130 B2 | 9/2006 | Blake et al. |
| 7,120,728 B2 | 10/2006 | Krakirian et al. |
| 7,124,207 B1 | 10/2006 | Lee et al. |
| 7,133,988 B2 | 11/2006 | Fujibayashi |
| 7,149,823 B2 | 12/2006 | Miller et al. |
| 7,155,569 B2 | 12/2006 | Johnson et al. |
| 7,164,425 B2 | 1/2007 | Kwak et al. |
| 7,174,274 B2 | 2/2007 | Carlson et al. |
| 7,202,801 B2 | 4/2007 | Chou |
| 7,277,387 B2 | 10/2007 | Sanders et al. |
| 7,315,911 B2 | 1/2008 | Davies et al. |
| 7,373,435 B2 | 5/2008 | Carlson et al. |
| 7,382,733 B2 | 6/2008 | Banerjee et al. |
| 7,395,284 B2 | 7/2008 | Sato et al. |
| 7,398,335 B2 | 7/2008 | Sonksen et al. |
| 7,484,021 B2 | 1/2009 | Rastogi et al. |
| 7,500,023 B2 | 3/2009 | Casper et al. |
| 7,500,030 B2 | 3/2009 | Hathorn et al. |
| 7,502,873 B2 | 3/2009 | Casper et al. |
| 7,512,133 B2 | 3/2009 | Dugan et al. |
| 7,516,248 B2 | 4/2009 | Carlson et al. |
| 7,539,777 B1 | 5/2009 | Aitken |
| 7,543,087 B2 | 6/2009 | Philbrick et al. |
| 7,555,554 B2 | 6/2009 | Manders et al. |
| 7,558,827 B2 | 7/2009 | Kawashima et al. |
| 7,564,791 B2 | 7/2009 | Jayakrishnan et al. |
| 7,577,772 B2 | 8/2009 | Sonksen et al. |
| 7,577,773 B1 | 8/2009 | Gandhi et al. |
| 7,594,057 B1 | 9/2009 | Gandhi et al. |
| 7,599,360 B2 | 10/2009 | Edsall et al. |
| 7,600,053 B2 | 10/2009 | Carlson et al. |
| 7,711,871 B1 | 5/2010 | Haechten et al. |
| 7,743,197 B2 | 6/2010 | Chavan et al. |
| 7,765,336 B2 | 7/2010 | Butler et al. |
| 7,826,349 B2 | 11/2010 | Kaur et al. |
| 7,840,717 B2 | 11/2010 | Flanagan et al. |
| 7,840,718 B2 | 11/2010 | Ricci et al. |
| 7,840,719 B2 | 11/2010 | Casper et al. |
| 7,856,511 B2 | 12/2010 | Ricci et al. |
| 7,941,570 B2 | 5/2011 | Flanagan et al. |
| 2001/0030943 A1 | 10/2001 | Gregg et al. |
| 2002/0032810 A1 | 3/2002 | Wagner |
| 2002/0062407 A1 | 5/2002 | Tateyama et al. |
| 2002/0099967 A1 | 7/2002 | Kawaguchi |
| 2002/0152338 A1 | 10/2002 | Elliott et al. |
| 2002/0178404 A1 | 11/2002 | Austen et al. |

(56) References Cited

U.S. PATENT DOCUMENTS

| | | |
|---|---|---|
| 2003/0002492 A1 | 1/2003 | Gallagher et al. |
| 2003/0056000 A1 | 3/2003 | Mullendore et al. |
| 2003/0084213 A1 | 5/2003 | Brice, Jr. et al. |
| 2003/0103504 A1 | 6/2003 | Dugan et al. |
| 2003/0158998 A1 | 8/2003 | Smith |
| 2003/0187627 A1 | 10/2003 | Hild et al. |
| 2003/0188053 A1 | 10/2003 | Tsai |
| 2003/0208581 A1 | 11/2003 | Behren et al. |
| 2004/0030822 A1 | 2/2004 | Rajan et al. |
| 2004/0054776 A1 | 3/2004 | Klotz et al. |
| 2004/0113772 A1 | 6/2004 | Hong Chou |
| 2004/0125960 A1 | 7/2004 | Fosgate et al. |
| 2004/0136241 A1 | 7/2004 | Rapp et al. |
| 2004/0151160 A1 | 8/2004 | Sanders et al. |
| 2004/0193968 A1 | 9/2004 | Dugan et al. |
| 2004/0210719 A1 | 10/2004 | Bushey et al. |
| 2004/0230706 A1 | 11/2004 | Carlson et al. |
| 2004/0260851 A1 | 12/2004 | Tu |
| 2005/0018673 A1 | 1/2005 | Dropps et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0204069 A1 | 9/2005 | Carlson et al. |
| 2005/0216617 A1 | 9/2005 | Carlson et al. |
| 2005/0223291 A1 | 10/2005 | Zimmer et al. |
| 2005/0229033 A1 | 10/2005 | Tanaka et al. |
| 2005/0257118 A1 | 11/2005 | Shien |
| 2006/0036769 A1 | 2/2006 | Frey et al. |
| 2006/0050726 A1 | 3/2006 | Ahmed et al. |
| 2006/0075154 A1 | 4/2006 | Carlson et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0005838 A1 | 1/2007 | Chang et al. |
| 2007/0016554 A1 | 1/2007 | Dapp et al. |
| 2007/0061463 A1 | 3/2007 | Hiramatsu et al. |
| 2007/0072543 A1 | 3/2007 | Paila et al. |
| 2007/0079022 A1 | 4/2007 | Carlson et al. |
| 2007/0079051 A1 | 4/2007 | Tanaka et al. |
| 2007/0091497 A1 | 4/2007 | Mizuno et al. |
| 2007/0162631 A1 | 7/2007 | Balakrishnan et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0043563 A1 | 2/2008 | Brice et al. |
| 2008/0059638 A1 | 3/2008 | Hathorn et al. |
| 2008/0103754 A1 | 5/2008 | Carlson et al. |
| 2008/0103755 A1 | 5/2008 | Carlson et al. |
| 2008/0109580 A1 | 5/2008 | Carlson et al. |
| 2008/0147889 A1 | 6/2008 | Casper et al. |
| 2008/0147890 A1 | 6/2008 | Casper et al. |
| 2008/0183877 A1 | 7/2008 | Carlson et al. |
| 2008/0235553 A1 | 9/2008 | Chintada |
| 2008/0256264 A1 | 10/2008 | Muto et al. |
| 2008/0273518 A1 | 11/2008 | Pratt |
| 2008/0307122 A1 | 12/2008 | Butler et al. |
| 2009/0049241 A1 | 2/2009 | Ohno et al. |
| 2009/0055585 A1 | 2/2009 | Fernandes et al. |
| 2009/0144586 A1 | 6/2009 | Casper et al. |
| 2009/0172203 A1 | 7/2009 | Casper et al. |
| 2009/0210557 A1 | 8/2009 | Gainey, Jr. et al. |
| 2009/0210559 A1 | 8/2009 | Flanagan et al. |
| 2009/0210560 A1 | 8/2009 | Yudenfriend et al. |
| 2009/0210561 A1 | 8/2009 | Ricci et al. |
| 2009/0210562 A1 | 8/2009 | Huang et al. |
| 2009/0210563 A1 | 8/2009 | Flanagan et al. |
| 2009/0210564 A1 | 8/2009 | Ricci et al. |
| 2009/0210570 A1 | 8/2009 | Bendyk et al. |
| 2009/0210571 A1 | 8/2009 | Casper et al. |
| 2009/0210572 A1 | 8/2009 | Yudenfriend et al. |
| 2009/0210573 A1 | 8/2009 | Yudenfriend et al. |
| 2009/0210576 A1 | 8/2009 | Casper et al. |
| 2009/0210579 A1 | 8/2009 | Bendyk et al. |
| 2009/0210580 A1 | 8/2009 | Bendyk et al. |
| 2009/0210581 A1 | 8/2009 | Flanagan et al. |
| 2009/0210582 A1 | 8/2009 | Bendyk et al. |
| 2009/0210583 A1 | 8/2009 | Bendyk et al. |
| 2009/0210584 A1 | 8/2009 | Carlson et al. |
| 2009/0210585 A1 | 8/2009 | Ricci et al. |
| 2009/0210768 A1 | 8/2009 | Carlson et al. |
| 2009/0210769 A1 | 8/2009 | Casper et al. |
| 2009/0210884 A1 | 8/2009 | Ricci et al. |
| 2009/0307388 A1 | 12/2009 | Tchapda |
| 2010/0014526 A1 | 1/2010 | Chavan et al. |
| 2010/0030919 A1 | 2/2010 | Flanagan et al. |
| 2010/0030920 A1 | 2/2010 | Casper et al. |
| 2010/0064072 A1 | 3/2010 | Tang et al. |
| 2011/0060848 A1* | 3/2011 | Casper et al. .......... 710/11 |

FOREIGN PATENT DOCUMENTS

| | | |
|---|---|---|
| GB | 2291990 | 2/1996 |
| JP | 63236152 | 10/1988 |
| JP | 2010-140127 A | 6/2010 |
| WO | WO2006102664 A2 | 9/2006 |

OTHER PUBLICATIONS

U.S. Appl. No. 13/024,468, Non Final Office Action Mailed Jan. 26, 2012.
U.S. Appl. No. 13/075,993, Final Office Action Mailed Feb. 13, 2012.
U.S. Appl. No. 12/030,981, Notice of Allowance mailed Jan. 27, 2012.
U.S. Appl. No. 12/031,023, Non-Final Office Action Mailed Feb. 1, 2012.
U.S. Appl. No. 12/030,993 Notice of Allowance Mailed Dec. 22, 2011.
U.S. Appl. No. 13/150,583, Non-Final Office Action Mailed Feb. 3, 2012.
U.S. Appl. No. 13/173,733, Non-Final Office Action Mailed Feb. 7, 2012.
U.S. Appl. No. 13/173,772 Non Final Office Action Mailed Feb. 3, 2012.
U.S. Appl. No. 12/031,201 Final Office Action dated Jun. 13, 2011.
U.S. Appl. No. 12/946,514, Non-Final Office Action Mailed Jun. 23, 2011.
U.S. Appl. No. 12/183,323, Notice of Allowance Mailed Jun. 23, 2011.
Z/Architecture • Principles of Operation SA 22/7832-01 International Business Machines Corporation, 2nd Edition, Oct. 2001.
U.S. Appl. No. 12/030,967 Restriction Requirement Mailed Dec. 29, 2009.
Aboda, B.-et al.; Network Working Group; "Securing Block Storage Protocols Over IP"; ACM Digital Library; RFC3723; Apr. 2004.
ANSI INCITS 433-2007, Information Technology Fibre Channel Link Services (FC-LS), Jul. 2007.
Azimi, R.-et al.; "miNI: Reducing Network Interface Memory Requirements with Dynamic Handle Lookup"; ACM Digital Library; pp. 261-272; Jun. 2003.
Behrs, Jr, "Adaptive Prediction Minimizes Data Overrun and Underrun", IBM, Nov. 1994, pp. 1-3. http://priorartdatabase.com/IPCOM/000114189.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
Meritt, A.S. and J.H. Sorg, "Correction of Channel Measurement Data Caused by Control Unit Queuing," IBM Technical Disclosure Bulletin, vol. 33, No. 11, Apr. 1991, pp. 100-103.
Dauby, et al. "Contention Resolution Between Two Processors"; IBM Technical Disclosure Bulletin; vol. 26; No. 10A; Mar. 1984; 3 pages.
DeVeer, J.A.; "Control Frame Multiplexing on Serial I/O Channels"; IBM Technical Disclosure Bulletin; vol. 32; No. 10A; Mar. 1990; pp. 39-40.
Emulex Corporation; "Install the LP850 Host Adapter"; Google/Emulex Corporation, LightPulse LP850 Fibre Channel PCI Host Adapter Manuals; pp. 1-10, 1999.

(56) References Cited

OTHER PUBLICATIONS

Fibre Channel Single Byte Command Code Sets-2 Mapping Protocol (FC-SB-3), T11/Project 1357-D/Rev 1.6, INCITS Mar. 2003.
"Information Technology—Fibre Channel Protocol for SCSI, Third Version (FCP-3)," T10 Project 1560-D, Revision 4g, Sep. 13, 2005.
Foong, A.-et al.; "Towards SSD-Ready Enterprise Platforms"; Google/Intel Corporation; 2008-2009.
Hewlett-Packard Company; "HP A4800A PCI FWD SCSI Host Bus Adapter—Service & User Guide", Edition 6; Google/H-P; 2001.
Hewlett-Packard Company; "HP A5149 PCI Ultra2 SCSI Host Bus Adapter—Service and User Guide", Edition 2; Google/H-P; 2001.
U.S. Appl. No. 12/031,038 Non-Final Office Action dated Nov. 16, 2009.
U.S. Appl. No. 12/030,912 Non-Final Office Action dated Mar. 18, 2010.
U.S. Appl. No. 12/030,920 Non-Final Office Action dated Feb. 23, 2010.
U.S. Appl. No. 12/030,975 Non-Final Office Action dated Oct. 22, 2009.
U.S. Appl. No. 12/030,932 Non-Final Office Action dated Dec. 16, 2009.
U.S. Appl. No. 12/031,023 Non-Final Office Action dated Oct. 29, 2009.
US Application No. I470034US Non-Final Office Action dated May 20, 2010.
U.S. Appl. No. 12/030,951 Non-Final Office Action dated Nov. 23, 2009.
U.S. Appl. No. 12/030,961 Non-Final Office Action dated Dec. 17, 2009.
U.S. Appl. No. 12/030,939 Non-Final Office Action dated Nov. 16, 2009.
U.S. Appl. No. 12/030,989 Non-Final Office Action dated Oct. 22, 2009.
U.S. Appl. No. 12/030,993 Non-Final Office Action dated Oct. 28, 2009.
U.S. Appl. No. 12/031,021 Non-Final Office Action dated Jan. 8, 2010.
U.S. Appl. No. 12/181,662—Non-Final Office Action dated Jun. 18, 2009.
U.S. Appl. No. 12/181,662—Final Office Action dated Jan. 4, 2010.
U.S. Appl. No. 12/031,038, Notice of Allowance Mailed Oct. 6, 2010.
U.S. Appl. No. 12/031,038, Non-Final Office Action Mailed Apr. 15, 2010.
Final Office Action for U.S. Appl. No. 12/030,912 mailed Oct. 6, 2010.
U.S. Appl. No. 12/031,182 Final Office Action Mailed Jul. 22, 2010.
U.S. Appl. No. 12/031,182, Non Final Office Action Mailed Dec. 23, 2010.
U.S. Appl. No. 12/030,920, Notice of Allowance Mailed Dec. 28, 2010.
U.S. Appl. No. 12/030,920 Notice of Allowance Mailed Aug. 23, 2010.
U.S. Appl. No. 12/030,954 Non-Final Office Action dated Jan. 21, 2010.
U.S. Appl. No. 12/030,954, Notice of Allowance mailed Dec. 28, 2010.
U.S. Appl. No. 12/030,975. Final Office Action Mailed May 13, 2010.
U.S. Appl. No. 12/030,975, Notice of Allowance Mailed Oct. 19, 2010.
U.S. Appl. No. 12/030,932, Final Office Action Mailed Jul. 23, 2010.
U.S. Appl. No. 12/030,932, Non-Final Office Action Mailed Dec. 16, 2010.
U.S. Appl. No. 12/031,023, Final Office Action Mailed Nov. 18, 2010.
U.S. Appl. No. 12/030,951, Final Office Action Mailed Oct. 26, 2010.
U.S. Appl. No. 12/030,951, Notice of Allowance Mailed Apr. 4, 2011.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/030,967, Notice of Allowance mailed Apr. 23, 2010.
Patent No. 7,174,274 Notice of Allowance Dec. 27, 2006.
U.S. Appl. No. 11/126,728 Non-Final Office Action Apr. 16, 2007.
Patent No. 7,373,435 Non-Final Office Action Jun. 11, 2007.
Patent No. 7,373, 435 Non-Final Office Action Sep. 13, 2007.
Patent No. 7,373,435 Notice of Allowance dated Apr. 30, 2008.
U.S. Appl. No. 11/469,573 Non-Final Office Action dated Apr. 11, 2008.
Patent No. 7,600,053 Non-Final Office Action dated Mar. 17, 2009.
Patent No. 7,600,053 Notice of Allowance dated Aug. 26, 2009.
U.S. Appl. No. 11/965,866 Non-Final Office Action dated Jun. 3, 2010.
Patent No. 7,516,248 Notice of Allowance Feb. 20, 2009.
U.S. Appl. No. 11/548,060 Non-Final Office Action dated Apr. 15, 2008.
U.S. Appl. No. 11/548,093 Non-Final Office Action dated Apr. 17, 2008.
U.S. Appl. No. 12/031,182 Non-Final Office Action dated Jan. 22, 2010.
U.S. Appl. No. 12/031,201 Non-Final Office Action dated Jan. 25, 2010.
U.S. Appl. No. 12/030,989 Final Office Action dated May 24, 2010.
U.S. Appl. No. 12/183,315, Notice of Allowance Mailed on Jun. 15, 2010.
International Search Report; International Application No. PCT/EP2009/059184; International Filing Date: Jul. 16, 2009; Date of mailing: Jan. 14, 2010; 9 pages.
"Protocol for Insochronous Traffic Over Fiber Channel Switching"; IBM Technical Disclosure Bulletin; vol. 37, No. 06B; Jun. 1994. pp. 377-380.
Golasky, Richard; "Link-Level Error Recovery With Tape Backup"; Dell Power Solutions; Aug. 2005; pp. 88-91.
Sachs, M.W.; "I/O Marker Changing"; IBM Technical Disclosure Bulletin; vol. 37, No. 02A; Feb. 1994; pp. 75-76.
Satran, J.-et al.; Network Working Group; "Internet Small Computer Systems Interface (iSCSI)"; ACM Digital Library; RFC3720; Apr. 2004.
SCSI Primary Commands—4 (SPC-4); Project T10/1731-D. Rev 11. INCITS Apr. 14, 2010 (Part 1 and Part 2).
Simmons et al; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.
Snively, et al.; "Fibre Channel, Framing and Signaling"; (FC-FS) Rev. 1.70; NCITS Working Draft Proposed American National Standard for Information Technology; Feb. 2002; pp. i-575.
Snively et al.; Fibre Channel Single Byte Command Code Sets-3 Mapping Protocol (FC-SB-3); T11/Project 1357-D/Rev. 1.6, INCITS; Mar. 2003; pp. 1-206.
Srikrishnan et al.; "Sharing FCP Adapters Through Virtualization"; IBM J. Res. & Dev., vol. 51, No. 1/2; Jan./Mar. 2007; pp. 103-118.
Stone, et al.; "When the CRC and TCP Checksum Disagree"; SIGCOMM '00, Stockholm, Sweden; Jul. 2000; 10 pages.
Laudon et al. •System Overview of the SGI Origin 200/2000 Product Line, 1997, iEEE Publication pp. 150-156.
Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.
U.S. Appl. No. 12/183,315, filed Jul. 31, 2008.
U.S. Appl. No. 12/183,323, filed Jul. 31, 2008.
U.S. Appl. No. 12/030,939 Notice of Alllowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/031,023 Non Final Office Action mailed Jun. 11, 2010.

(56) References Cited

OTHER PUBLICATIONS

U.S. Appl. No. 12/183,323 Non Final Office Action mailed Jul. 19, 2010.
U.S. Appl. No. 12/392,246 Notice of Allowance mailed Jul. 15, 2010.
U.S. Appl. No. 12/183,305, filed Jul. 31, 2008.
Vaghani, SB.; "Virtual Machine File System"; VMWare Inc./ACM Digital Library; pp. 57-69; 2008-2009.
"z/Architecture—Principles of Operation," IBM Publication No. SA22-7832-04, 5th Ed., Sep. 2005.
U.S. Appl. No. 12/031,201, Final Office Action Mailed Aug. 3, 2010.
U.S. Appl. No. 12/031,201, Non-Final Office Action Mailed Dec. 27, 2010.
U.S. Appl. No. 12/030,985, Non Final Office Action Mailed May 5, 2010.
U.S. Appl. No. 12/030,985, Notice of Allowance mailed Nov. 24, 2010.
U.S. Appl. No. 12/030,993, Final Office Action Mailed Dec. 10, 2010.
U.S. Appl. No. 12/031,042, Final Office Action Mailed Oct. 25, 2010.
U.S. Appl. No. 12/031,042, Non-Final Office Action Mailed Apr. 5, 2010.
U.S. Appl. No. 12/031,021, Notice of Allowance Mailed Apr. 30, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/364,615, Notice of Allowance Mailed Mar. 10, 2011.
U.S. Appl. No. 12/183,305, Non-Final Office Action Mailed May 11, 2010.
U.S. Appl. No. 12/183,305, Notice of Allowance Mailed Nov. 1, 2010.
U.S. Appl. No. 12/183,315, Notice of Allowance Mailed Dec. 13, 2010.
U.S. Appl. No. 12/183,315 Notice of Allowance dated Jun. 15, 2010.
U.S. Appl. No. 12/183,323, Non-Final Office Action Mailed Jan. 3, 2011.
IBM, "Method and Apparatus to Monitor PAV Utilization", Feb. 2005, pp. 1-3. http://priorartdatabase.com/IPCOM/000082878.
IBM® z/Architecture Principles of Operation, Publication No. SA22-7832-05, 6th Edition, Apr. 2007. 1,215 pages separated into 4 electronic attachments_Part 1.
IBM® z/Architecture Principles of Operation, Publication No. SA22-7832-05, 6th Edition, Apr. 2007. 1,215 pages separated into 4 electronic attachments. Part 2.
IBM® z/Architecture Principles of Operation, Publication No. SA22-7832-05, 6th Edition, Apr. 2007. 1,215 pages separated into 4 electronic attachments. Part 3.
IBM® z/Architecture Principles of Operation, Publication No. SA22-7832-05, 6th Edition, Apr. 2007. 1,215 pages separated into 4 electronic attachments. Part 4.
Z/Series Input/Output Configuration Program user•s Guide for IYP IOCP, SB10-7029-03c. International Business Machines Corporation, Jun. 2003.
Iren, et al.; "The Transport Layer: Tutorial and Survey"; ACM Computing Surveys; vol. 31, No. 4; Dec. 1999; pp. 360-405.
Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.
International Search Report and Written Opinion for PCT/EP2009/051447 dated Jul. 1, 2009.
International Search Report and Written Opinion for PCT/EP2009/051483 dated Jul. 27, 2009.
Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051461 dated Sep. 22, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
Jiang, J.-et al.; "The Role of FCoE in I/O Consolidation"; ACM Digital Library/International Conf on Advanced Infocomm Technology '08; Jul. 2008.
Josephson, WK.-et al.; "DFS: A File System for Virtualized Flash Storage"; ACM Digital Library; vol. 6, No. 3, Article 14, Sep. 2010.
LSI Corporation; "PCI Express to 6Gb/s SAS Host Bus Adapters"; Google; Chapter 1, Introduction/Overview; LSI User Guide; Oct. 2009.
LSI; "ScsiPortGetDeivceBase"; Google/LSI; Apr. 2003.
Magoutis, K.; "The Optimistic Direct Access File System: Design and Network Interface Support"; Division of Engineering & Applied Science, Harvard Univ.; Feb. 2002.
Miller, DJ.-et al.; "Motivating Future Interconnects: A Differential Measurement Analysis of PCI Latency"; ACM Digital Library; pp. 94-105; Oct. 2009.
Moore et al., Reconfiguration of Storage Elements to Improve Performance, IBM, Dec. 1983, pp. 1-3. http://priorartdatabas.com/IPCOM/000047719.
Network Storage Systems; Google; Oct. 2007.
Nordstrom.; "Sequence Reception Method for a Fibre Channel Protocol Chip"; IBM Technical Disclosure Bulletin; vol. 38, No. 12; Dec. 1995; pp. 267-269.
Sun, Oracle; "Sun Storage 6 Gb SAS PCIe HBA, External—Installation Guide for HBA Models"; Google; Revision A; Nov. 2010.
Petersen, MK.-et al.; "DIF/DIX Aware Linux SCSI HBA Interface"; Google; Oracle Linux Engineering; Jul. 2008.
Peterson; "Information Techonology, Fibre Channel Protocol for SCSI, Fourth Version (FCP-3)", Draft Proposed American National Standard, Jun. 2004; pp. 1-142.
Patent No. 7,000,036 Notice of Allowance dated Feb. 3, 2006.
Patent No. 7,000,036 Non-Final Office Action dated Jul. 15, 2005.
Patent No. 7,174,274 Non-Final Office Action dated Jun. 8, 2006.
Patent No. 7,174,274 Non-Final Office Action dated Jun. 21, 2006.
Patent No. 7,174,274 Notice of Allowance Sep. 13, 2007.
U.S. Appl. No. 12/030,912 Non Final Office Action Mailed Aug. 18, 2011.
U.S. Appl. No. 12/031,182 Final Office Action dated Oct. 20, 2011.
U.S. Appl. No. 12/030,925, Notice of Allowance Mailed Sep. 7, 2011.
U.S. Appl. No. 13/075,993 Non Final Office Action Mailed Aug. 31, 2011.
U.S. Appl. No. 12/030,932, Notice of Allowance mailed Nov. 1, 2011.
U.S. Appl. No. 12/030,981 Non Final Office Action Mailed Aug. 2, 2011.
U.S. Appl. No. 12/030,938, Notice of Allowance Mailed Aug. 8, 2011.
U.S. Appl. No. 12/030,989, Notice of Allowance Mailed Aug. 5, 2011.
U.S. Appl. No. 12/031,042, Non-Final Office Action Mailed Sep. 30, 2011.

\* cited by examiner

FIG. 5

| Row | BYTE 0 01234567 | BYTE 1 01234567 | BYTE 2 01234567 | BYTE 3 01234567 | BYTE 4 01234567 | BYTE 5 01234567 | BYTE 6 01234567 | BYTE 7 01234567 |
|---|---|---|---|---|---|---|---|---|
| 1 | 00000000 | 00000000 | 00000000 | | | | | |
| 2 | ACW INDEX | | CTL | VALIDATION FIELD | | | | |
| 3 | | | | 40 BIT ADDRESS for Local Channel Memory | | | 16 Meg Byte Offset | |

Figure 3 – Data Router PCIe Address mapping

FIG. 15

| BYTE 0 01234567 | BYTE 1 01234567 | BYTE 2 01234567 | BYTE 3 01234567 | BYTE 4 01234567 | BYTE 5 01234567 | BYTE 6 01234567 | BYTE 7 01234567 |
|---|---|---|---|---|---|---|---|
| INDEX for ACW | | CTL, field | ACW VALIDATION FIELD | | ACW-16 Meg Byte Offset | | |

Address part of an Address Control Structure passed to the HBA

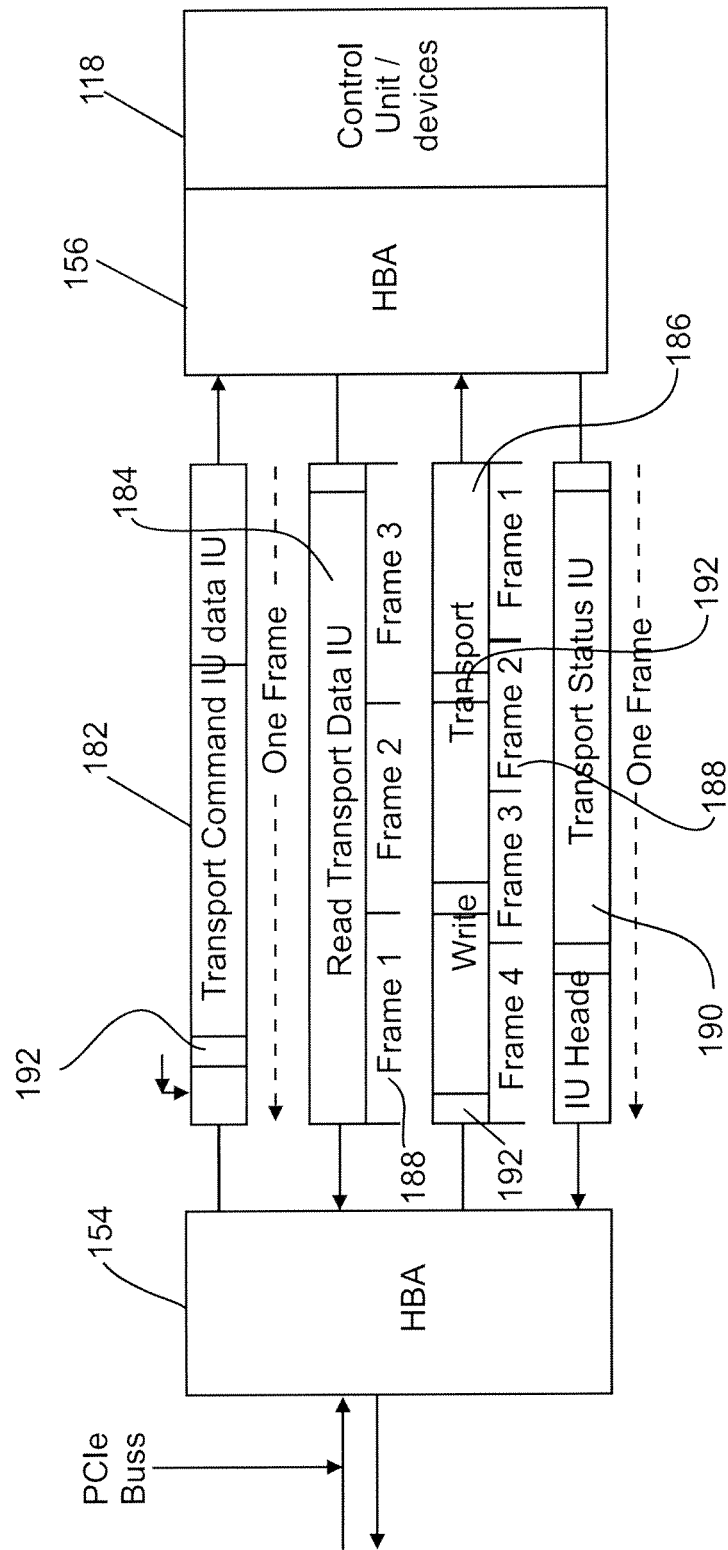

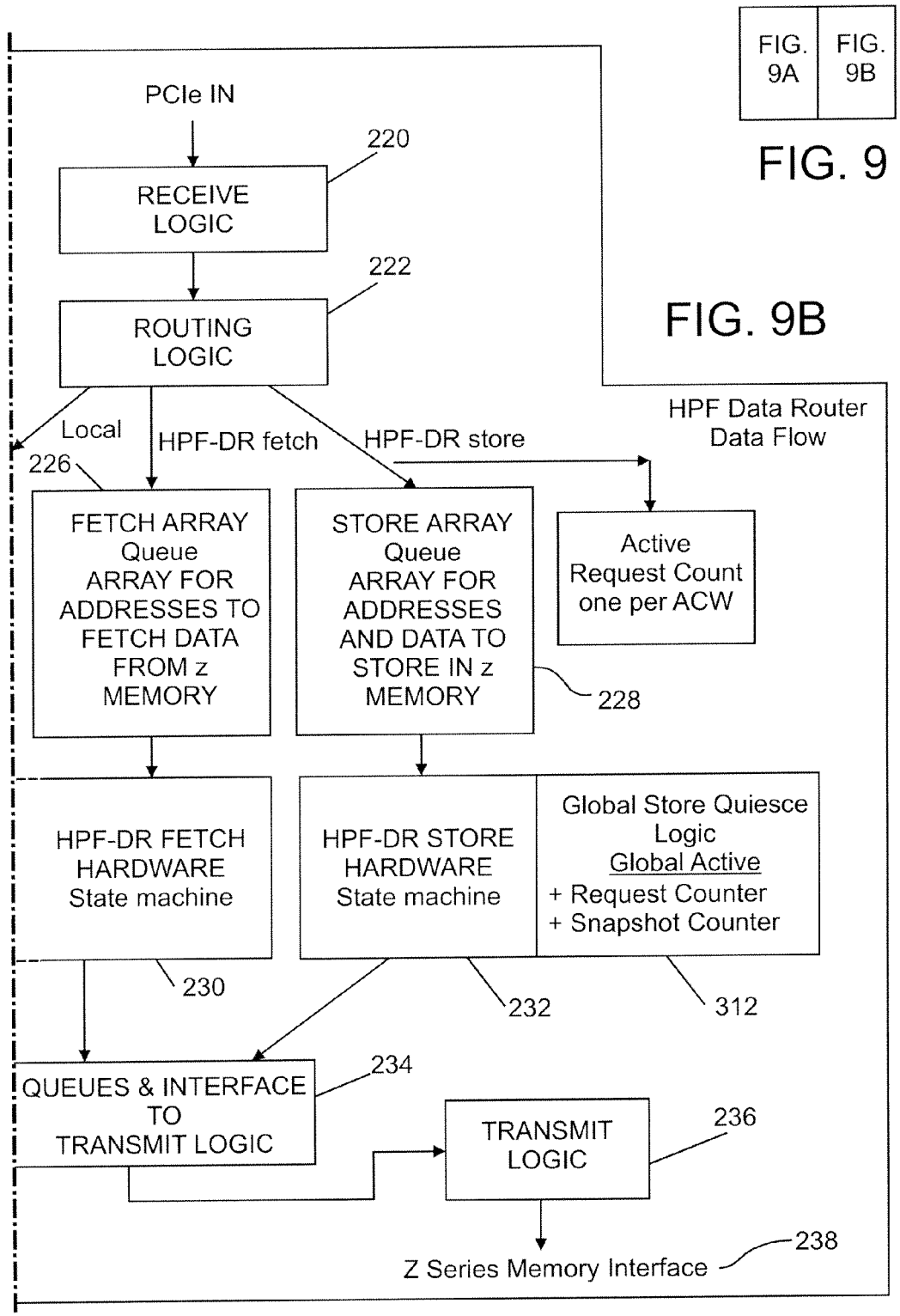

Figure 7 - Write Data ACW, used to fetch customer data from zSeries Memory

Figure 8 - Transport Status ACW used to store the receive the Extend Status in zSeries Memory

FIBRE CHANNEL INPUT/OUTPUT DATA ROUTING SYSTEM AND METHOD

CROSS REFERENCE TO RELATED APPLICATIONS

This application is a continuation of U.S. patent application Ser. No. 13/150,530 filed Jun. 1, 2011, the entire disclosure of which is incorporated herein by reference.

BACKGROUND

The present disclosure relates generally to input/output processing, and in particular, to facilitating transfer of data between a channel subsystem and a network interface during input/output processing.

Input/output (I/O) operations are used to transfer data between a host computer system memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

The channel subsystem and I/O device may operate in a transport mode that supports the transfer of one or more command control blocks to transfer data between the I/O devices and memory. A transport control word (TCW) specifies one or more I/O commands to be executed. For commands initiating certain I/O operations, the TCW designates memory areas associated with the operation, the action to be taken whenever a transfer to or from the area is completed, and other options.

Generally the host computer system and the channel subsystem are connected to I/O devices over a link via a host bus adaptor (HBA). The HBA is coupled to a channel, which includes hardware including a channel microprocessor and local channel memory that appears as the host system to the HBA. The channel hardware isolates the HBA from the host computer and its memory spaces.

SUMMARY

One embodiment includes a method of performing an input/output (I/O) processing operation at a host computer system configured for communication with a control unit. The method includes: obtaining information relating to an I/O operation at a channel subsystem in the host computer system, the channel subsystem including at least one channel having a channel processor and a local channel memory; generating addressing information and forwarding the addressing information from the at least one channel to a network interface between the channel subsystem and at least one I/O device, the addressing information specifying a location in the local channel memory; forwarding an I/O command message to the at least one I/O device via the network interface; responsive to the I/O command message, receiving a data transfer request from the network interface that includes the addressing information; responsive to receiving the data transfer request, accessing one of a plurality of address control words (ACWs), each ACW specifying an address of a location in a host computer memory; and routing the data transfer request to the host memory location specified in the ACW.

Other apparatuses, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 depicts embodiments of an address field for an address control structure;

FIG. 6 depicts an example of various messages transmitted between a channel and a control unit during a transport mode I/O operation;

FIGS. 9A-9B (collectively referred to as FIG. 9) is a block diagram depicting the data flow through logical components of the data router of FIG. 7;

FIG. 15 depicts an embodiment of an address field for an address control structure.

Figure 1:
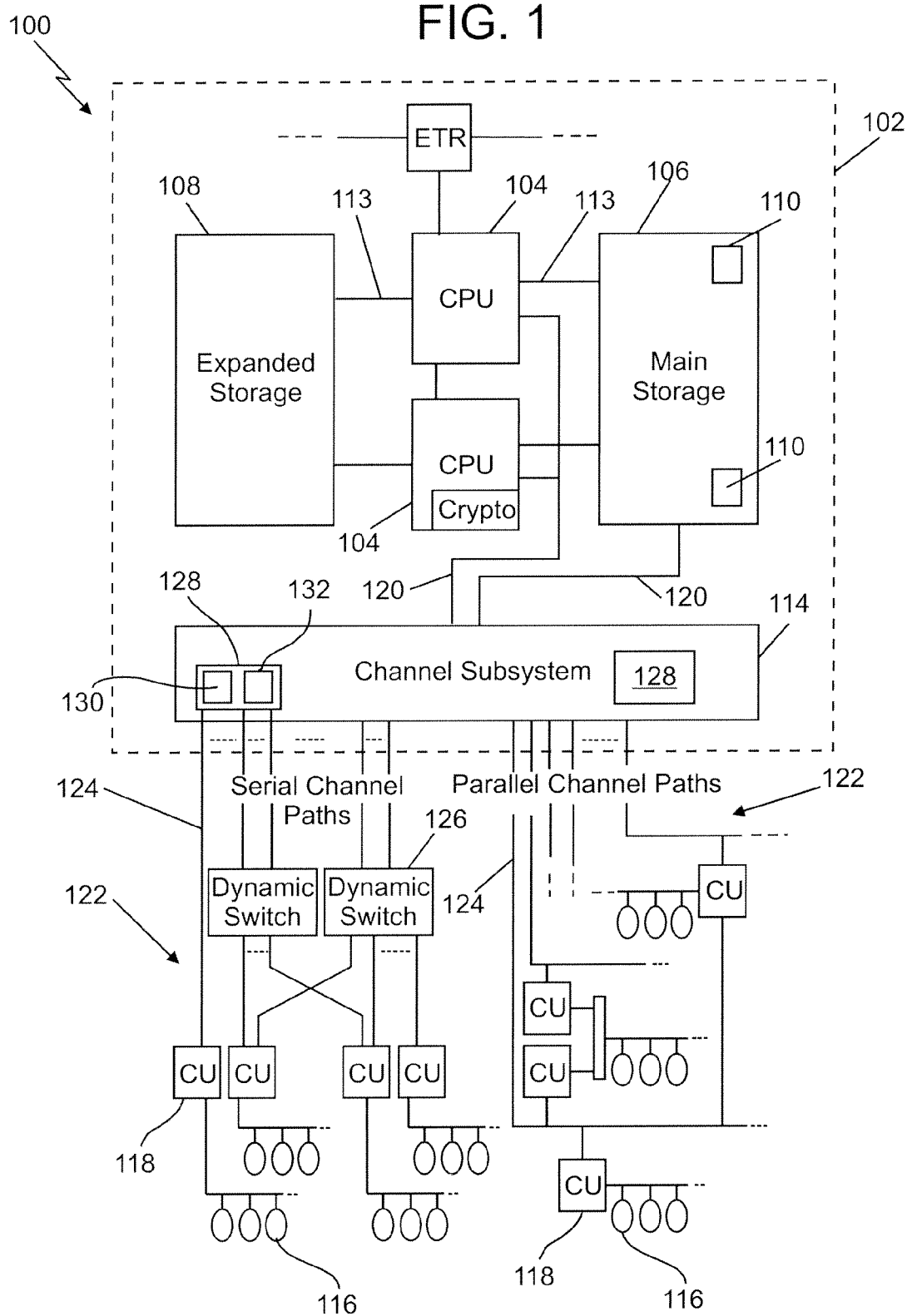
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION

In accordance with an aspect of the present invention, input/output (I/O) processing is facilitated. For instance, I/O processing is facilitated by providing a data router in a channel of a channel subsystem that allows a host bus adaptor (HBA) connected to the channel to directly access a host memory in a host computer during an I/O operation without the need to store input or output data in the channel. This configuration provides a substantial increase (e.g., by a factor of two) in channels' I/O start rates and a reduction of the response time of each I/O operation compared to the prior art channel store and forward designs in which all transactions between the host computer and the HBA are checked, translated and forwarded by the channel micro processor.

For example, a channel is equipped with data router hardware that is configured to generate and provide the HBA with one or more address control structures through which the channel informs the HBA of a local channel memory area assigned to the HBA. In order to allow the HBA to address multiple address spaces in the host memory, each address control structure includes information regarding a location in the local channel memory that includes a host memory address. In one embodiment, one or more address control structures include an address (e.g., a 64 bit PCIe address) that includes a field specifying a local channel memory address of a corresponding address command word (ACW). For example, the address control structure includes an ACW index field that includes an index into a contiguous block of ACWs in the local channel memory.

In one embodiment, a system and method is provided for checking an HBA while the HBA directly addresses the host memory during an I/O operation. For example, the ACW provides the ability for the data router to provide a required level of data checking for a device having direct access the host memory, as well as the ability to isolate a failed HBA from the host computer. For example, address control structures and associated ACWs include validation and offset fields that are checked by the data router when an HBA data transfer request is received.

In one embodiment, a system and method is provided for inserting or removing headers to or from memory requests between the HBA and the host memory. In prior art systems, the channel can receive and store header information from an HBA read request in the local channel memory, or generate a header and append the header to output data in response to an HBA write request. The embodiment described herein allows the channel (via the data router hardware) to store a read request header in local channel memory while input data is directly stored in the host memory, and also to generate and append a header to output data that has been directly accessed from the host memory via a HBA write request. For example, a read ACW is provided for HBA read requests and a write ACW is provided for HBA write requests. The read ACW is used to store header information that is received with input data, and the write ACW is used to store header information used to generate a header and append the header to output data.

In one embodiment, a system and method is provided for inserting check fields into output data and checking input data during direct data transfers between the HBA and the host memory during an I/O operation to provide means for detecting whether transferred data has been corrupted. In prior art systems, for write (output) operations, the channel sets up data check words with customer output data that was stored in the local channel memory. For read (input) operations, the channel stores the input data and data check words in local channel memory and performs a check of the data. Examples of data check words include cyclical redundancy check (CRC) words, longitudinal redundancy check (LRC) words, and Check Sum data. In the embodiments described herein, the channel data router hardware uses an ACW to insert and/or check data check words (in this case, data check words are stored or generated from the local channel memory while the customer data, i.e., input or output data, is directly transferred between the host memory and the HBA).

For example, the data router uses an address sent to the HBA (e.g., divides a PCIe address) to reference an ACW that includes one or more locations from which to store or generate data check words. A field such as an ACW index field in the address is used to reference an ACW, which includes an initial value or "starting seed" for a Data Check Word and a location to save intermediate Data Check Words and state. In one embodiment, if indirect data addressing is used in the I/O operation, the ACW also includes associated Transport Indirect Data Address Words (TIDAWs), that provides the host memory addresses, counts and control information of where to insert intermediate Data Check Words and the final Data Check Word on outbound data. For inbound data, if specified, the TIDAWs provide the host memory addresses, counts and a flag bit informing the hardware if the data is to be stored or discarded.

In one embodiment, the system and methods provide for the ability of the data router to determine how to store customer data into the host memory when an HBA read request is received out of order. In addition, the data router has the ability to detect missing or lost intermediate data. Input and output data should be stored in the host memory in the same order that it was transmitted in order to properly calculate data check words. In one embodiment, an address control structure for an I/O operation, such as a read or write address control structure, includes an offset field that increments for each HBA transfer request that is sent to the channel for an I/O operation. A corresponding ACW includes a next-expected offset field that is compared with the offset field in each HBA transfer request associated with the address control structure. If these field values do not match, the received HBA request is, e.g., re-queued at the bottom of a HBA receive queue.

In one embodiment, the system and method are provided for terminating one of a plurality of I/O operations being performed via the HBA (during which the HBA is directly accessing the host memory), without initializing the HBA. In some instances, an I/O operation will encounter a host memory exception, and if multiple I/O operations are being performed on the host computer, it is desired that only the I/O operation be terminated. This embodiment allows only the operation causing the exception to be terminated, such that the HBA is not initialized (which could cause all of the I/O operations being performed via the HBA to be terminated).

In this embodiment, the ACW for a data transfer may includes a Read Discard bit, a Write Drop bit or a Firmware Read Discard Bit that indicates whether a host memory exception has occurred. If all of these bits are zero, the data router processes a HBA request into a host memory request for the data transfer. If an exception is returned from a host memory request, the exception reason is stored into the associated ACW along with either Write Drop Bit or the Read Discard bit set to a one. For example, if the I/O operation is a write then the HBA is signaled to abort the I/O operation that received the fetch storage exception. The Write Drop bit is set to a one in the ACW which will cause the HBA to be signaled to abort the I/O operation again if the HBA makes a new request for that I/O operation. If the I/O operation is a read, then receiving the storage exception on the host memory store request causes the Read Discard bit in the ACW to be set to a one. All subsequent data for that I/O operation received from the HBA will be dropped.

FIG. 1 illustrates an exemplary embodiment of an I/O processing system 100 that includes a host computer system 102 that includes a data storage and/or processing system such as a zSeries® mainframe computer by International Business Machines Corporation (IBM®). IBM is a registered trademark of International Business Machines Corporation, Armonk, N.Y., USA. Other names used herein may be registered trademarks, trademarks or product names of International Business Machines Corporation or other companies. The host computer system 102 includes various processing, storage and communication elements. In one embodiment, the host computer system 102 includes one or more central processing units (CPUs) 104, memory components (e.g., zSeries memory) such as a main storage or memory 106 and/or an expanded storage or memory 108 (collectively referred to as the "host memory"). The system 102 also includes, one or more operating systems (OSs) 110 that are executed by one or more of the CPUs 104. For example, one CPU 104 can execute a Linux® operating system 110 and/or a z/OS® operating system 110 as different virtual machine instances. CPU 104 is the controlling center of the I/O processing system 100. It contains sequencing and processing facilities for instruction execution, interruption action, timing functions, initial program loading, and other machine-related functions. CPU 104 is coupled to the main memory 106 and/or expanded memory 108 via a connection 113, such as a bidirectional or unidirectional bus.

The host computer system 102 also includes a channel subsystem 114 that provides a communication interface between the host computer system 102 and various I/O devices 116, which may controlled by one or more control units 118. I/O devices include equipment such as printers, magnetic-tape units, direct-access-storage devices, displays, keyboards, communications controllers, teleprocessing devices, and sensor-based equipment. The channel subsystem 114 directs the flow of information between the I/O devices 116 and the host computer system 102. It relieves the CPUs 104 of the task of communicating directly with the I/O devices 116 and permits data processing to proceed concurrently with I/O processing. The channel subsystem 114 is coupled to the CPUs 104, the main memory 106 and/or the expanded memory 108 via a connection 120, such as a bus.

In one embodiment, the channel subsystem 114 is connected to each I/O device 116 via a respective "channel path" 122 that connects the channel subsystem 114 to each control unit 118 via a connection 124 such as a serial or parallel link. Control units 118 may be attached to the channel subsystem 114 via more than one channel path 122, and an I/O device 116 may be attached to more than one control unit 118. In all, an individual I/O device 116 may be accessible by multiple channel paths. A channel path can use various types of connections, such as a parallel interface, a serial-I/O interface and a FICON I/O interface. For example, a serial channel path may include one or more optical fibers connected to a control unit 118 via, e.g., a dynamic switch 126 in a Fibre channel fabric, and a parallel interface may include a number of electrical conductors. The FICON I/O interface is described in the ANSI standards document "Fibre Channel-Single-Byte Command Code Sets Mapping Protocol—4 (FC-SB-4)," T11 Project 2122-D, Revision 3.00, Sep. 22, 2000, which is incorporated herein by reference in its entirety.

In one embodiment, the channel subsystem 114 includes one or more individual channels 128 that are each connected to one or more control units 118 and/or I/O devices 116 via one or more channel paths 122. Each channel 128 includes processing electronics such as a local channel microprocessor 130 and a local channel memory 132 that is connected to and accessible by the local channel microprocessor 130. The local channel memory 132 may include information such as a channel-program designation, a channel-path identifier, a device number, a device count, status indications, as well as information on path availability and functions pending or being performed.

Also located within each channel 128 are one or more subchannels. Each subchannel is a data structure located within a channel memory 132 that provides information concerning an associated I/O device 116 and its attachment to the channel subsystem 114. The subchannel also provides information concerning I/O operations and other functions involving the associated I/O device 116. The subchannel is the means by which the channel subsystem 114 provides information about associated I/O devices 116 to the CPUs 104. Channels 128 that are connected to multiple control units 122 or multiple I/O devices 116 may have multiple subchannels, each dedicated to a single I/O device 116. In one embodiment, the number of subchannels provided by the channel subsystem is independent of the number of channel paths 122 to the associated I/O devices 116. For example, a device 116 accessible through alternate channel paths 122 still is represented by a single subchannel.

Each control unit 118 provides logic to operate and control one or more I/O devices 116 and adapts, through the use of common facilities, the characteristics of each I/O device 116 to the link interface provided by a channel 128. The common facilities provide for the execution of I/O operations, indications concerning the status of I/O devices 116 and the control unit 118, control of the timing of data transfers over a channel path 122 and certain levels of I/O device control. A control unit 118 may be housed separately, or may be physically and logically integrated with an I/O device, the channel subsystem, or a CPU.

I/O operations are described as any operation that involves the transfer of data between the host computer system 102 and I/O devices 116. As described herein, an I/O operation includes the communications between the channel subsystem 114 and a device 116 (via, in one embodiment, a control unit 118) in which a single command (e.g., a channel command word or CCW), a single command message including multiple commands (e.g., a transport command information unit transporting a Transport Command Control block (TCCB)), or multiple chained commands (e.g., multiple CCWs) are sent from the channel subsystem 114 to a device. The I/O operation may also include one or more response messages generated by the device 116 or an associated control unit 118 in response to receiving and/or executing the command or chained commands.

In one embodiment, I/O operations are initiated with a device 116 by the execution of I/O instructions generated by an OS 110 that designate the subchannel associated with the device 116. Such instructions are executed in the host system by a CPU 104 by sending parameters to the channel subchannel that requests that the channel subsystem 114 perform various functions in an I/O operation through some channel 128.

For example, the CPU 104 executes a "START SUBCHANNEL" instruction by passing parameters to the target subchannel requesting that the channel subsystem 114 perform a start function with the I/O device 116 associated with the subchannel. The channel subsystem 114 performs the start function by using information at the subchannel, including the information passed during the execution of the START SUBCHANNEL instruction, to find an accessible channel path to the device 116, and to execute the I/O operation once a channel path has been selected.

When an instruction such as a START SUBCHANNEL instruction is executed by the CPU 104, a channel 128 commences performing the I/O operation. In one embodiment, the channel subsystem 114 operates under Fibre Channel protocol such as a High Performance FICON (HPF) for communication between the channel subsystem 114 and the devices 116 and/or control units 118. FICON and HPF and its phases are described further in "Fibre Channel: Single-Byte Command Code Sets Mapping Protocol—4 (FC-SB-4)," T11 Project 2122-D, Revision 3.00, Sep. 22, 2000, which is hereby incorporated herein by reference in its entirety.

In one embodiment, execution of the START SUBCHANNEL instruction passes the contents of an operation request block (ORB) to the channel subsystem 114. The ORB specifies a channel program that includes an address of one or more command words (e.g., a channel command word or a transport command word described further below). There are two modes of subchannel operation. In one embodiment, the host computer system 102 operates in a command mode and specifies command word(s) in the form of a channel command word (CCW). In another embodiment, the host system operates in a transport mode and specifies command word(s) in the form of a transport command word (TCW).

A subchannel may enter a transport mode when an FCX (Fibre Channel Extensions) facility is installed and the start function is set at the subchannel as the result of the execution of a START SUBCHANNEL instruction that specifies a TCW channel program. The subchannel remains in transport mode until the start function is reset at the subchannel. At all other times, the subchannel is in command mode.

In command mode, the channel executes a CCW channel program that include a single channel-command word or a sequence of channel-command words executed sequentially that control a specific sequence of channel operations. A control unit executes a CCW I/O operation by decoding, accepting, and executing CCW commands by an I/O device. One or more CCWs arranged for sequential execution form a CCW channel program and are executed as one or more I/O operations, respectively.

The fibre-channel-extensions (FCX) facility is an optional facility that provides for the formation of a transport mode channel program that is composed of a transport control word (TCW) that designates a transport-command-control block (TCCB) and a transport-status block (TSB). The TCCB includes a transport-command area (TCA) which contains a list of one or more (e.g., up to 30) I/O commands that are in the form of device-command words (DCWs). A TCW and its TCCB may specify either a read or a write operation. In one embodiment, a FCX-bidirectional-data-transfer facility may be installed in a system that supports transport mode operations, that allows the host computer system 102 to specify transfer of both input and output data in a single transport mode I/O operation if the connected device 116 and control unit 118 supports bidirectional-data transfer. When a control unit 118 recognizes bi-directional data transfers, a TCW and its TCCB may, depending on the device, specify both read and write data transfers.

In the transport mode, a single transport command word (TCW) specifies a location in memory of a TCCB (as well as a location in memory 106 of one or more data areas) that is sent in a single message instead of separate individual CCWs in the command mode. A control unit 118 executes a transport mode I/O operation by decoding, accepting, and executing a TCCB and the individual DCWs included therein. If the ORB specifies a TCW channel program, the channel subsystem 114 uses information in the designated TCW to transfer the TCCB to a control unit 118. The contents of the TCCB are ignored by the channel subsystem 114 after the TCCB is transferred to the control unit 118 and only have meaning to the control unit 118 and the associated I/O device 116.

In an exemplary embodiment, the control unit 118 generates a response message in response to executing the channel program. The control unit 118 may also generate a response message without executing the channel program under a limited number of communication scenarios, e.g., to inform the channel subsystem 114 that the channel program will not be executed. The control unit 118 may include a number of elements to support communication between the I/O communications adapter and I/O devices, as well as in support of channel program execution. For example, the control unit 118 can include control logic to parse and process messages, in addition to one or more queues, timers, and registers to facilitate communication and status monitoring.

Figure 2:
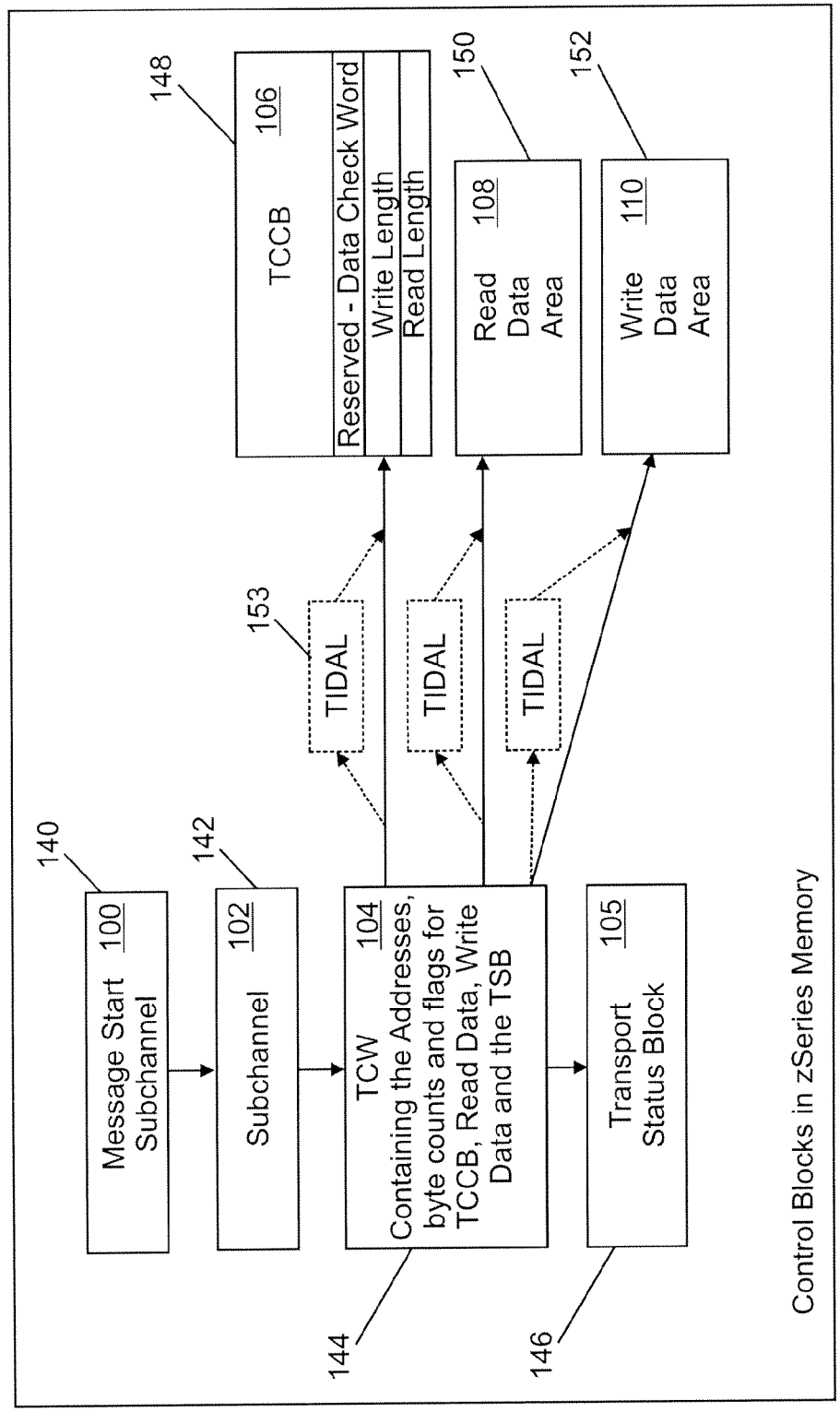
FIG. 2 depicts exemplary control blocks generated by a host computer system for a transport mode I/O operation.

FIG. 2 shows exemplary control blocks that are setup in the host memory, by software, prior to the OS software executing an instruction (e.g., a START SUBCHANNEL instruction) that passes the Start Subchannel message to an I/O processor (IOP) in the channel subsystem 114 for a HPF I/O operation. The architecture of these control blocks and one or more of the above components of the I/O processing system 100 are further described in "IBM® z/Architecture Principles of Operation," Publication No. SA22-7832-8, 9th Edition, August 2010, which is hereby incorporated herein by reference in its entirety.

As shown in FIG. 2, a Start Subchannel message 140 is passed to the channel subsystem 114, which designates a subchannel 142, a TCW 144 and a transport status block (TSB) 146. The TCW contains addresses in the host memory of a TCCB 148, a location 150 of read data designated for the I/O operation, and/or a location 152 of write data designated for the I/O operation. The TCCB 148 and the locations 150 and 152 may be directly addressed or indirectly addressed by, for example a Transport Indirect Data Address List (TIDAL) 153.

Figure 3:
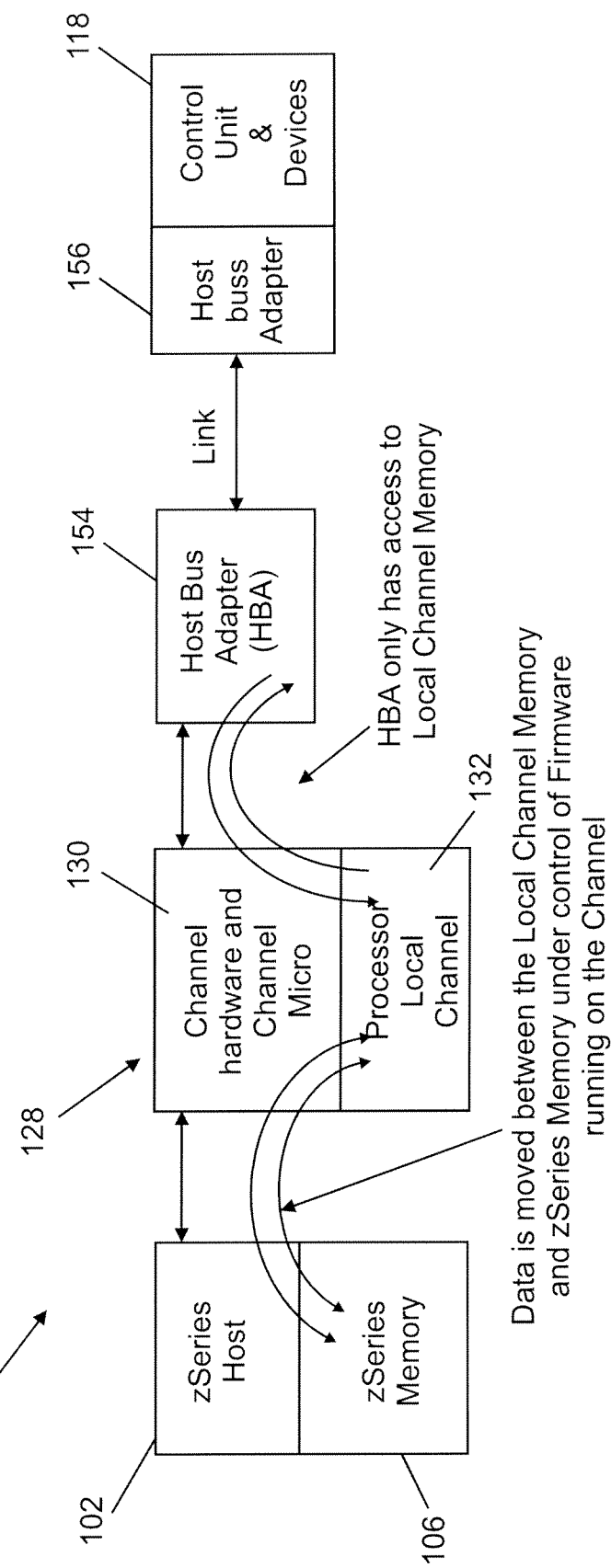
FIG. 3 depicts a prior art configuration of a I/O processing system including a host bus adaptor (HBA) connected to a channel subsystem.

FIG. 3 illustrates an embodiment of a prior art configuration of a communications link between the host system 102, the channel subsystem 114 and a control unit 118. The channel 128 communicates with the host CPU via a channel microprocessor 130, and is configured to transfer data between the host memory and a local channel memory 132, e.g., for retrieving a TCCB 148 or components of a TCCB 148. A network or link interface such as a host bus adaptor (HBA) 154 is connected to the channel 128 via, for example, a PCIe bus 155. The HBA 154 coordinates the flow of information between the channel 128 and a control unit 118, for example, via a control unit HBA 156. In this embodiment, the HBA 154 communicates with the channel 128 and only has access to the local channel memory 132. Thus, the HBA 154 is isolated from the host computer and the host memory. Data sent to or from the HBA 154 is stored in or fetched from the local channel memory 132. This isolation is utilized for error checking of the data that is transferred between the host memory and the control unit 118. The performance penalty for this isolation is that all customer data flows through this isolation hardware as a store and forward through local channel memory 132.

Figure 4:
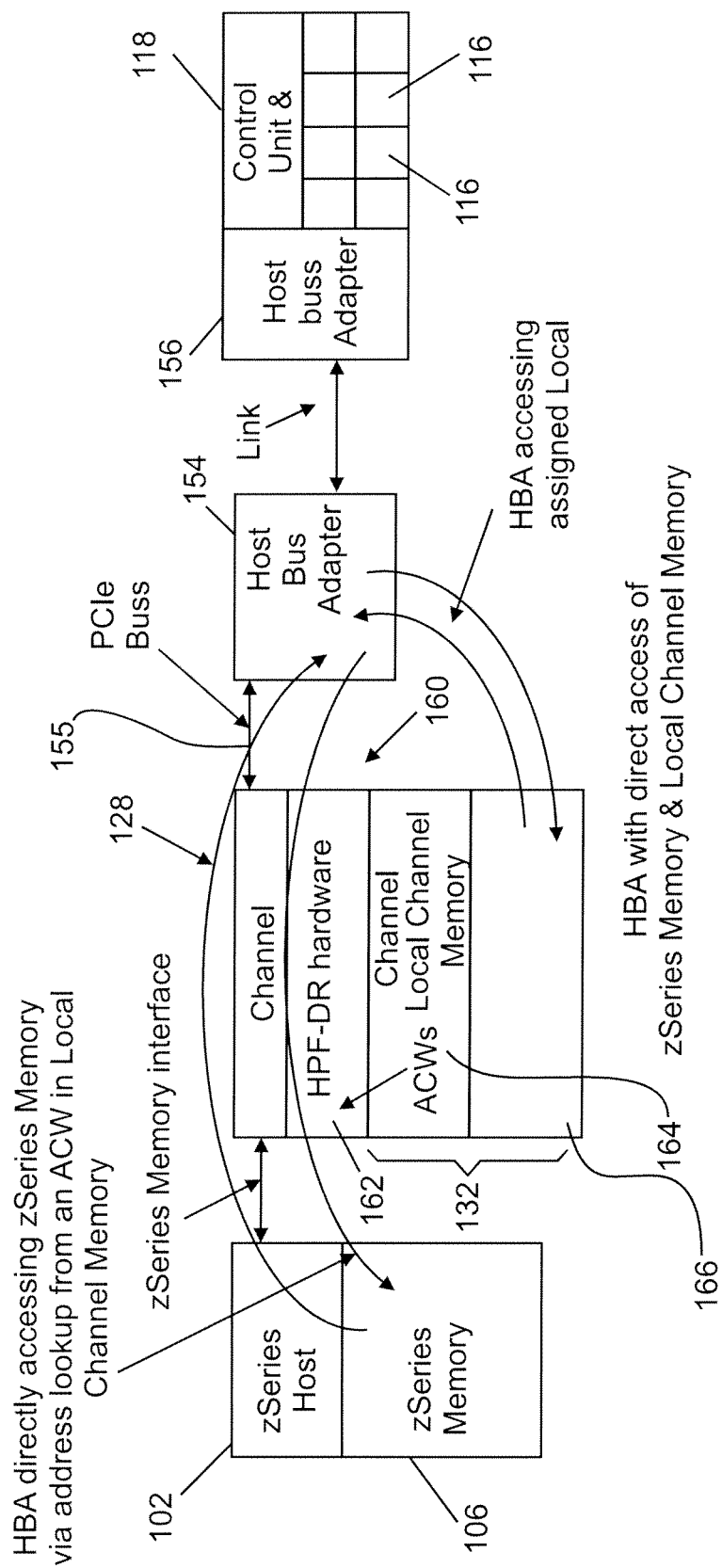
FIG. 4 depicts one embodiment of a I/O processing system including a host bus adaptor (HBA) connected to a channel subsystem.

FIG. 4 illustrates an embodiment of the communications link that allows for isolation for error checking while allowing the HBA 154 to directly access the host memory without having to store input or output data in the channel's local memory 132. In contrast to the configuration of FIG. 3, the channel 128 includes the microprocessor as well as a data router 160. In one embodiment, the data router 160 is a high performance Fibre Channel data router (HPF-DR) that supports the FC-SB-4 (also referred to as HPF) protocol. The data router 60 allows the HBA 154 to directly access the host memory, without needing to store input or output data (i.e., customer data) requested per an I/O operation in the local channel memory 132. The data router 160, in one embodiment, includes data router hardware 162 and a local channel memory region 164 in which state information is setup for the data router to process HBA data transfer requests. As described herein "HBA data transfer requests" include any communications from the HBA 154 to the channel 128 that request the transfer of output data (i.e., write or fetch data) from the host memory to the control unit 118 (e.g., a "HBA write request" or "HBA fetch request") or request the transfer of input data (i.e., read or store data) from the control unit 118 to the host memory (e.g., a "HBA read request" or "HBA store request"). In addition, in one embodiment, the local channel memory 132 includes a region 166 (e.g., before the 4 gig line) that is assigned to the HBA 154 and accessible by the HBA 154, which is used for processing local channel requests and operations.

After receiving the I/O instruction and ORB from the host, and prior to performing the I/O operation and sending the I/O operation to the HBA 154, the channel 128 sets up one or more address control structures and associated address control words (ACWs) that are used to generate host memory requests to the host computer 102 and allow the HBA 154 to directly access the host memory. The ACWs and data control structures also provide a means by which the data router 160 can append or store headers to or from HBA data transfer requests sent by the HBA 154, as well as provide a means for checking the HBA requests for errors without storing the input or output data in the local channel memory 132.

For example, after a start subchannel message 140 is passed to the channel 128 (e.g., via an I/O processor in the channel subsystem 114), the channel microprocessor 130 running firmware receives the start subchannel message 140 to read and/or write data from and to a device 116 and into and out of the host memory. The channel 128 uses the information in the start subchannel message 140 to fetch the subchannel 142. In the subchannel 142 is the host memory address that the channel firmware uses to fetch the TCW 144. The channel 128 uses the information from the start subchannel message 140, the subchannel 142 and the TCW 144 to set up various ACWs. Each ACW is a control block the data router 160 uses to route HBA data transfer requests to a host memory address specified in the TCW 144. Multiple ACWs can be set up, including one ACW for read commands that includes at least one host memory address for storing input data, one ACW for write commands that includes at least one host memory address for output data, an ACW that is used to assemble a an I/O command message such as a transport-command information unit (IU) including a TCCB 148, and an ACW for receiving and storing status information.

Along with setting up the ACWs, the channel 128 sets up "address control structures" for each ACW from information in the TCW 144 and passes the address control structures through the local channel memory 132 to the HBA 154 (e.g., via a local channel memory HBA work queue) prior to the HBA 154 being informed of the I/O operation. Multiple address control structures are passed to the HBA 154 and used by the HBA 154 to fetch or store information into or out of the host memory. The address control structures allow the HBA 154 to address multiple address spaces, while also allowing the data router hardware to check stored or fetched data for errors. For example, one address control structure is used for fetching the information that makes up the command message (e.g., transport command IU), one is used for storing the ending status from the control unit response (e.g., a transport status IU) at the completion of an I/O operation, and multiple "data address control structures" may be used by the HBA 154 for transferring input or output data. For example, one "read address control structure" is used for every 8 megabytes of read data transferred from a device 116 to the host memory, and one "write address control structure" is used for every 8 megabytes of data requested from the host memory. Only the read or the write address control structure is required if the I/O operation only transfers data in one direction.

Each address control structure includes an address sent to the HBA 154 that is used by the HBA to make requests to the channel 128. The address is seen by the HBA 154 as a single address, but is used to refer to multiple address spaces in the host memory. Exemplary address control structures each include a 64 bit PCIe address, a data byte count, direction bits and control information. For example, each address control structure includes a data byte count of the amount of data to be transferred by that address control structure and control bits that inform the HBA 154 the direction the data is to be transferred and how many address control structures are required to transfer the data.

FIG. 5 illustrates embodiments of an address field 172 of an exemplary address control structure 170. In this example, the address field 172 includes 64 bit PCIe address, but is not limited thereto. The address field 172 includes a control (CTL) field 174 (e.g., byte 2 of the address 172) that indicates whether to route an HBA request to local channel memory to be handled internally by the channel 128, or whether to process and route the HBA request to the host memory via the data router 160. For example, if the address field 172 includes the CTL field 174 set to zero, the data router 160 routes the request to the local channel memory region 166. However, if the CTL filed 174 is set to a selected value (e.g., 0x02), the address 172 is configured to allow the HBA 154 to address the host memory via the data router hardware. In this configuration, the address 172 (shown in row 3 of FIG. 5) is divided up into four fields: an ACW Index field 176 (e.g., bytes 0 and 1), the CTL field 174 (e.g., byte 2), a Validation field 178 (e.g., bytes 3 and 4), and an Offset field 180 (e.g., bytes 5-7). In one embodiment, the ACW Index field 176 is the index into a contiguous block of ACWs in the local channel memory region 164, and is used by the data router hardware to locate an ACW for an associated HBA request and address control structure. The Validation field 178 (e.g., a 16 bit field) is set to a unique value for each ACW defined in the local channel memory region 164.

After the channel 128 sets up the ACWs and the address control structures 170 for an I/O operation, the channel 128 informs the HBA 154 of the pending I/O operation and sends the corresponding address control structures 170 required for executing the I/O operation.

FIG. 6 illustrates various messages transmitted between the channel 128 and the control unit 118 during an I/O operation. After the channel microprocessor 130 has set up the data router 160 with the required information, the HBA 154 fetches and stores various information units (IUs). A transport command IU 182 includes the TCCB 148 and header information and is sent over the channel path 122 to the control unit 118. During execution of the I/O operation, data IUs including a read transport data IU 184 and/or a write transport data IU 186 are transmitted to send input and/or output data. In one embodiment, each data IU, depending on its size, may be sent as one or more frames 188. A frame 188 is a unit or packet of data that is transmitted within a link wrapper on a link or channel path, and has a maximum size that depends on the link architecture. At the conclusion of an I/O operation, a transport status IU 190 is sent from the control unit 118 that indicates the transport status of the operation (e.g., completed or aborted). Normally, the transport command IU 182 and the Transport Status IU 190 are each transmitted on the link with one frame. In one embodiment, each frame of an IU requires at least one HBA request (e.g., PCIe request) from the HBA 154.

In one embodiment, the IUs include one or more data check words 192 (e.g., CRCs) located at the end of or close to the end of an IU. For example, a data check word 192 for the transport command IU 182 is either 1 or 2 words from the end of the IU. A write transport data IU 182 may have multiple intermediate data check words 192, each checking a portion of the write transport data IU 182. The transport status IU 190 has a data check word 192 for the IU header and a data check word 192 for the transport status.

Figure 7:
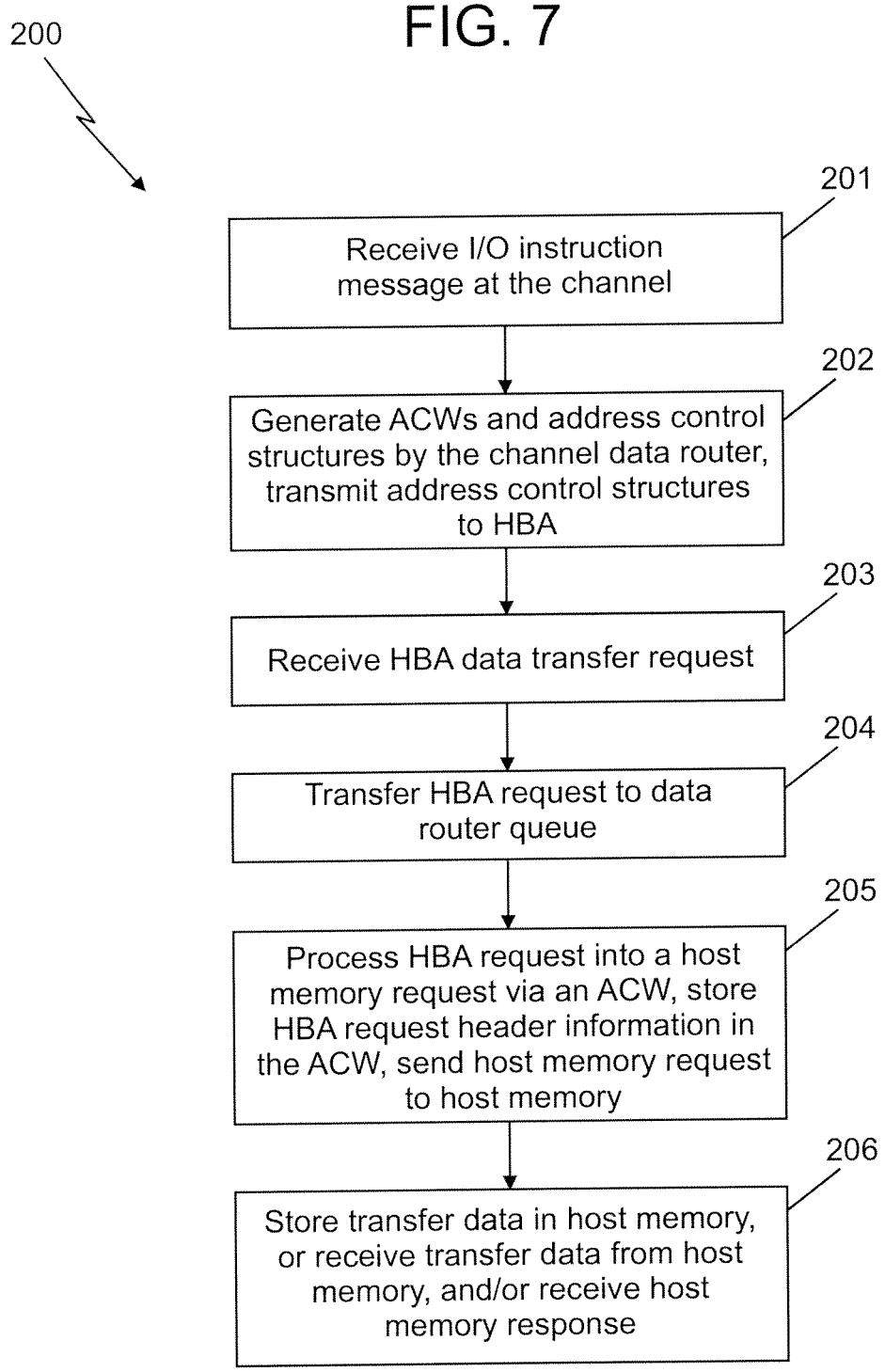
FIG. 7 is a flow chart depicting an exemplary method of processing data transfers via a channel data router and a HBA during an I/O operation.
Figure 8:
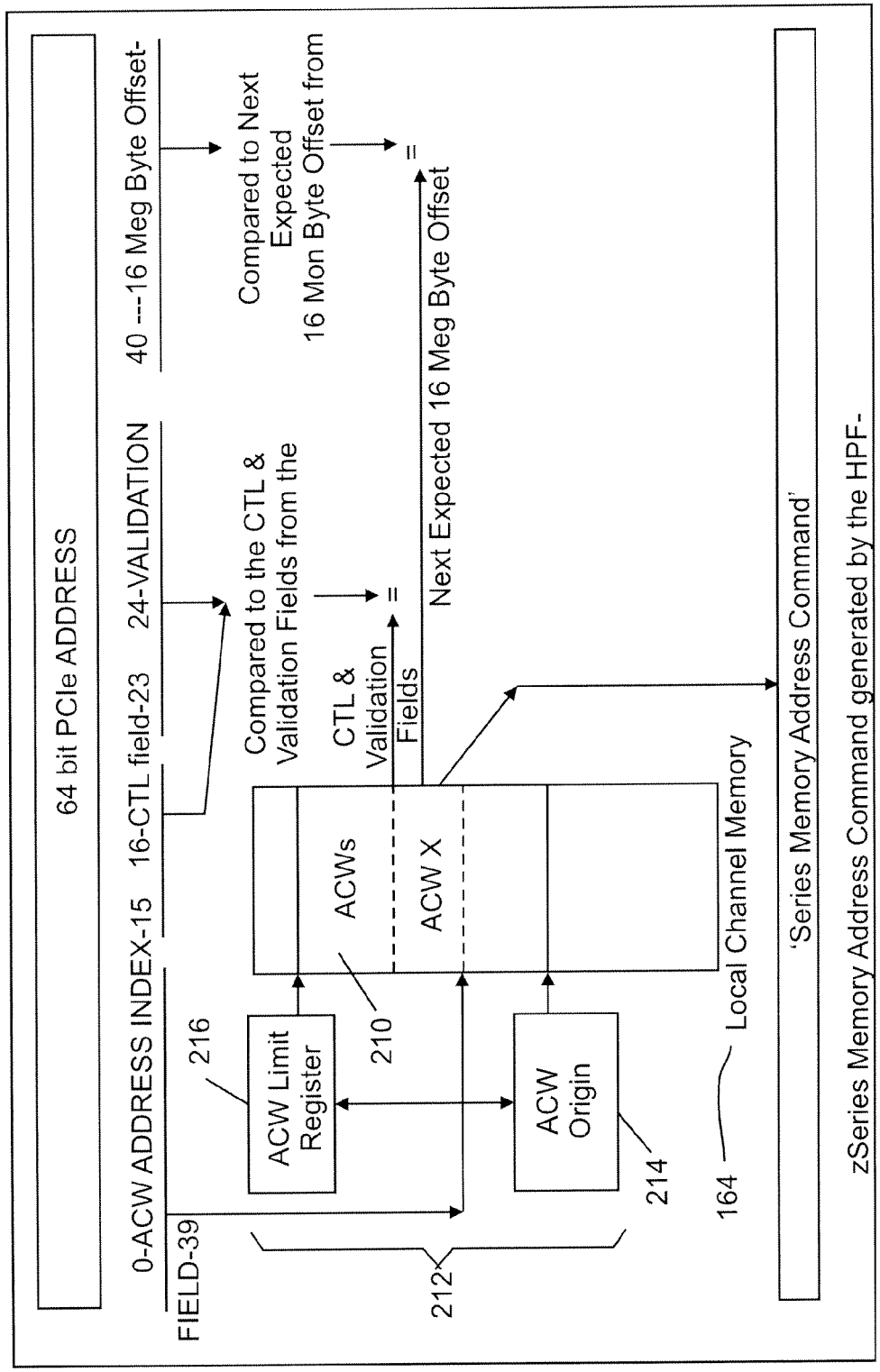
FIG. 8 depicts an embodiment of a channel local memory region utilized by the data router of FIG. 7.
Figure 9A:
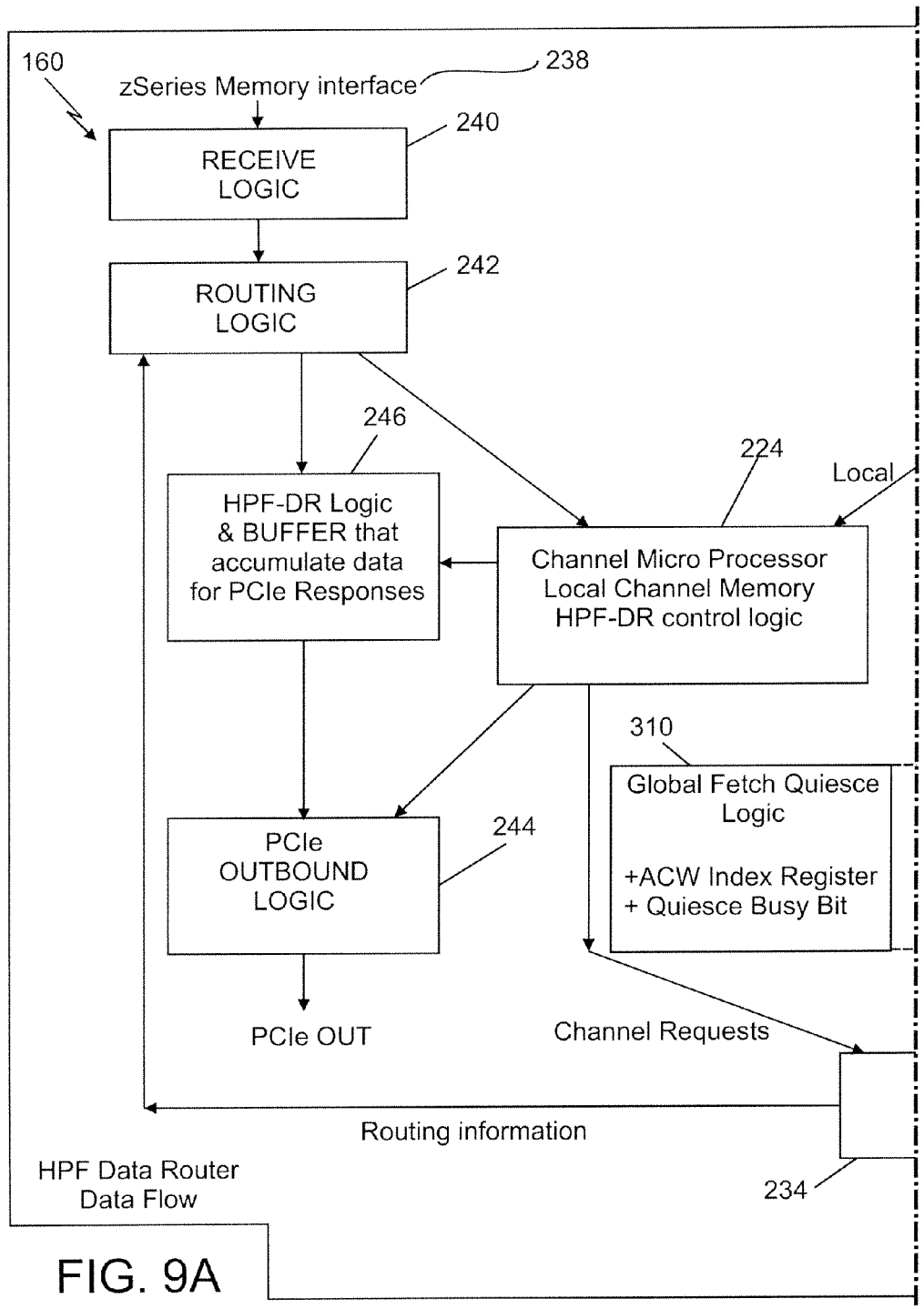

FIGS. 7, 8 and 9 are shown to illustrate an embodiment of a method 200 of performing an I/O operation. The method includes one or more stages 201-206. In one embodiment, the method includes the execution of all of the stages 201-206 in the order described. However, certain stages may be omitted, stages may be added, or the order of the stages changed.

In the first stage 201, the channel 128 receives an instruction message 140 and ORB from the host CPU 104, and fetches the subchannel 142 and then the TCW 144 and other required data.

In the second stage 202, the channel 128 or the data router 160 generates address control structures 170 and corresponding ACWs 210 (shown in FIG. 8). Exemplary control structures 170 and ACWs 210 (which are further described below with reference to FIGS. 10-15 below) include a Transport Command ACW and a Transport Command Address Control Structure corresponding to the transport command IU 182, a Transport Read Data ACW and one or more Transport Read Data Address Control Structures corresponding to one or more read transport data IUs 184 or frames, a Transport Write Data ACW and one or more Transport Write Data Address Control Structures corresponding to one or more write transport data IUs 186 or frames, and a Transport Status ACW and Transport Ending Status Address Control Structure corresponding to the transport status IU 190. The data router 160 transmits the address control structures 170 to the HBA 154. A list 212 of the ACWs 210 is assembled in the local channel memory region 164.

FIG. 8 illustrates a configuration of the data router 160 that includes the ACWs 210 stored in the local address memory region 164. In one embodiment, the memory region 164 is the HBA address space located above a selected boundary (e.g., the 1 terabyte boundary) in the local channel memory 132 that houses a list 212 of the ACWs 210 used to address the host memory. In one embodiment, the list 212 is a list of contiguous ACWs. An ACW Origin Register 214 is the starting address of the list 212 of ACWs 210. The ACW Index 176 from the ACW Index field 176 in a data control structure is added to the ACW Origin 214 to generate a local address where the corresponding ACW resides in the local channel memory region 164. The ACW Limit Register 216 is the ending address of the list 212 of ACWs 210. When the ACW Index 176 is added to the ACW Origin to fetch an ACW, the result cannot be larger then the ACW Limit minus the ACW size.

In the third stage 203, a transport command IU 182 is assembled at the HBA 154 for transmission to a control unit 118. The HBA 154 uses the Transport Command Address Control Structure to initiate a fetch of the TCCB 148 from the host memory, by sending a HBA fetch request to the data router 160. In one embodiment, the requests sent to and from the HBA are controlled by the PCI Express (PCIe) protocol, although other protocols could be used.

In the fourth stage 204, the HBA fetch request arrives at the data router 160, which is received by receiving logic 220 that converts the bits sent from the HBA 154 into data packets, and is routed by routing logic 222 based on the HBA address 172 in each packet.

For example, all HBA requests with an address designating the local memory area (e.g., below $2^{40}$) are routed to the channel microprocessor 224 and local channel memory 166 and handled internally as Local Channel Memory requests. In one embodiment, any time a PCIe bus is in 64 bit addressing mode and the CTL field 174 is 0x00, or when a PCIe operation is in 32 bit mode, the BHA request is routed to Local Channel Memory. This allows the HBA 154 to have direct access to the local channel memory area that the HBA 154 has access rights to. The HBA 154 is not given direct access rights to the local channel memory area 164 where the ACWs 210 reside.

All requests with addresses in the memory area 164 (e.g., above $2^{40}$) are routed to either a Fetch Array Queue 226 or a Store Array Queue 228 to be handled by the data router 160. The entire data packet (header and data) received from the receiving logic 220 is saved as an entry in either of these two arrays. The Fetch Array Queue 226 and the Store Array Queue 228 are located in Data Router Fetch hardware 230 and Data Router Store hardware 232, respectively, which process HBA requests from these queues into host memory requests that are transferred to the host memory.

In the fifth stage 205, processing logic 234 queues and prioritizes the channel requests in the local channel memory 164 and the HBA requests in queues 226 and 228, and processes the request packets into host memory packets.

The processing logic 234 takes the ACW index field 176 of the HBA address (from the Transport Command Address Data Control Structure) in an HBA request packet to index into the list of ACWs 210 set of ACWs starting at the ACW Origin Register 214 to fetch the ACW corresponding with the HBA address 170. In this example the desired ACW is a Transport Command ACW. For example, the processing logic 234 takes the ACW Index value and adds it to the ACW origin register 214 to generate a Local Channel Memory address from where it fetches the ACW. Based on the memory address field in the ACW, the processing logic 234 generates a host memory request that is sent from transmit logic 236 to the host memory (via, for example, a host memory interface 238) indicating the memory address from which data is transferred or to which data is stored. Additional information from the ACW, including a Zone ID, a Key value a data length may also be used to generate the host memory request.

In this embodiment, the address in the ACW's memory address field is the location or locations of the TCCB 148. If indirect data addressing is not enabled in the ACW, then the host memory address is the address of the entire TCCB 148. If indirect data addressing is enabled in the ACW, then the data router 160 fetches a Transport Indirect Data Address Word (TIDAW) from the host memory address and then uses the address in the TIDAW as the host memory address.

Figure 10:
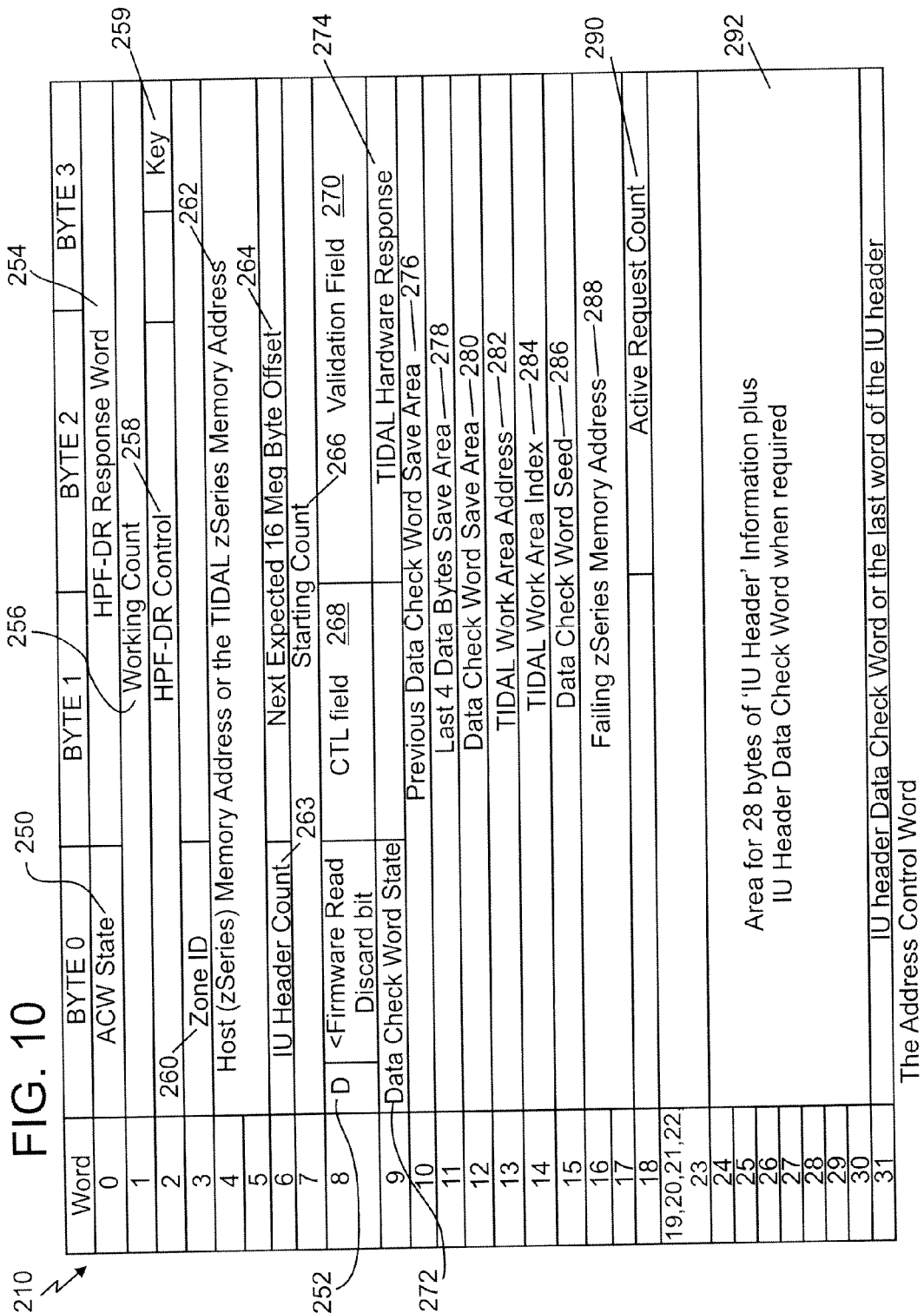
FIG. 10 depicts one embodiment of an address control word (ACW)

In one embodiment, a TIDAW is specified if a value in the ACW indicates that indirect data addresses is being used (e.g., a HPF-DR Control 258 bit 17 shown in FIG. 10 is 0). TIDAWs include both an address and a count. A TIDAW Data Address field in the TIDAW is used to address a host memory location for the number of bytes of data specified in the TIDAW. An exemplary TIDAW includes four words, including a first word having a flags field, a count field specifying the number of bytes to be transferred with this TIDAW, a TIDAW Data Address High word and a TIDAW Data Address Low word. The following flags may be included in the flags field:

Bit 0—Last TIDAW: This flag bit set to a one informs the data router hardware that this is the last TIDAW in this TIDAL that may be used for this operation. If the current TIDAW Flag bit 0 'Last TIDAW' is not active, then when the byte count in the current TIDAW transitions to zero and the ACW Working Count has not transition to zero, the data router hardware will continue data transfer using the next TIDAW in the TIDAL to address the host memory;

Bit 1—Read Skip: This flag bit set to a one informs the data router hardware to discard the data being received from a device per the byte count field of this TIDAW. However the Data Check Word continues to be calculated as the data is discarded. This flag bit is ignored if the I/O operation is a write.

Bit 2—Data Transfer Interruption: This bit Causes the data router hardware to set the TIDAW format check bit 10 in the HPF-DR Response Word 254 and end the I/O operation when this TIDAW is attempted to be used by the HPF-DR hardware.

Bit 3—T-TIC: This flag bit set to a one informs the data router hardware that the address in this TIDAW is not used for data but is a host memory address for the start of a new TIDAL that has to be fetched from host memory to retrieve the next TIDAW to use for this I/O operation; and Bit 4—Insert PAD & & Data Check Word: This flag bit set to a one informs the data router hardware to insert pad bytes up to the next word boundary, if not on a word boundary, and then insert the current value of the calculated Data Check Word. The pad bytes (if any) and the Data Check Word are inserted after the byte count of data specified by this TIDAW entry has been transmitted and flag bit 0, last TIDAW, is not set to a one. The current ACW Data Check Word is then reseeded back to Data Check Word seed in the ACW.

In the sixth stage 206, the data router 160 receives a host memory response via host memory receive logic 240, which includes the TCCB 148 in this embodiment. In other embodiment, depending on the host memory request, the host memory response may include output data for a write command or a status message for a read command. Routing logic 242 routes the host memory response to a data buffer and logic 246. The data buffer and logic 246 merges IU Header information from the Transport Command ACW (i.e., from the IU Header field) with the TCCB 148 in a response packet which may be returned to the HBA 154 via outbound logic 244 that interfaces with the HBA 154. For I/O operations that include multiple output data requests, the data buffer 246 may accumulates data from the multiple requests to generate a complete response packet back to the HBA 154.

As described above, during the execution of an I/O operation, transport data IUs may be transmitted between the HBA 154 and the control unit 118. To execute write commands, the HBA 154 requests information to assemble a write transport data IU 186, including output data from the host memory (the address of which is specified by the Memory Address field of the write ACW) and IU header information retrieved from the write ACW. To execute read commands, the HBA stores input data from a read transport data IU 184 to a host memory address specified in the Memory Address field of the read ACW and storing IU header information from the read transport data IU 184 to the read ACW.

For example, the HBA 154 receives a read transport data IU 184 and generates one or more HBA read requests that are sent to the channel 128 to store input data into the host memory. Each read request includes an address field 172 from a corresponding Read Data Address Control Structure. The HBA read request is received by the receive logic 220, and the routing logic 222 routes the HBA read request to the Store Array Queue 228. The ACW Index field 176 of the address field 172 is used to index into the list of ACWs 210 as described above, and fetch the read ACW. The read transport data IU header information is stored in the Read Data ACW, and a host memory read request is sent to the host memory to request storage of input data in the address(es) specified by the Read Data ACW.

In one embodiment, it may take multiple host memory read requests to store one HBA read request. For example, if each host memory read request is 256 bytes and a HBA read request is 2048 bytes, then it takes eight host memory read requests to store the one HBA read request. In this embodiment, the host memory read responses are returned from the host memory interface 238 to the data router hardware, which correlates each response to each read request that was made.

In another example, the HBA 154 may send a write transport data IU 186 to the control unit 118. In one embodiment, unless Transport Ready is disabled, the channel 128 requires a transfer-ready IU to be sent from the control unit 118 prior to sending each write transport data IU 186. The control unit 118 may request additional data by sending additional transfer-ready IUs until it has requested all the data specified by the TCCB 148.

If Transfer Ready is disabled, which allows the HBA 154 to send an IU of data to the device 116 without the device 116 asking for the data IU, then the HBA 154 initiates HBA write requests to the data router 160. The HBA 154 uses the address field 172 from each Write Data Address Control Structure to send each HBA write request to initiate fetching the data from the host memory. Each HBA write request is received by the routing logic 222, which routes each HBA write request into the Fetch Array Queue 226. The ACW index field from the address field 172 is used to fetch Write Data ACW from the local channel memory region 164. One or more host memory write requests are used to request output data, which is received from the host memory in a host memory write response and sent to the HBA 154 through the routing logic 242 and the data buffer 246 to the HBA 154. If multiple host memory write requests are needed to process one HBA write request, than each host memory write response is processed as described with reference to the read requests described above.

In one embodiment, when a device 116 ends the I/O operation by sending the Transport Status IU 190 to the HBA 154, the HBA 154 uses the Transport Ending Status Address Control Structure to send a HBA store request to initiate storing the ending status into the host memory. The data router 160 fetches the Transport Status ACW using the HBA store request, and stores the ending status header in the IU Header area of the Status ACW and a host memory store request is sent to the host memory to store the extended status in the address specified in the Status ACW. After the HBA 154 has completed the I/O operation, the HBA 154 generates a HBA request with completion status that is routed and stored in the local channel memory 132, and control of the I/O operation is returned to the channel 128 firmware.

When the HBA returns an I/O operation back to the channel microprocessor firmware, there are no fetch requests queued in the Fetch Array Queue, because the HBA 154 knows when they are completed when the requested data is returned back to the HBA 154. However there may be one or more host memory store requests still queued in the Store Array Queue 228 because the HBA 154 does not receive the completion responses for the HBA store request(s). Therefore, in one embodiment, when the HBA 154 returns an I/O operation back to the channel microprocessor on, e.g., a Firmware I/O completion queue, the microprocessor firmware may perform the following testing of bits in the Transport Read ACW and the Transport Status ACW: For the Transport Status ACW, the firmware waits for the ACW State field to move to 2 if the ACW is not already at state 2 (the ACW State field is describe further below). When Firmware sees that this ACW is in state 2, then Firmware inspects the IU Header field to determine which Device the ACW was working with. Now, the firmware waits for the Active Request Count for both the Read ACW and the Status ACW to decrement to zero by watching the Active Request Count=Zero bit to be set to a one in each of the ACWs before inspecting or changing any fields in any of the four ACWs assigned to the I/O operation. Once the Active Request Counts are zero for both of the ACWs, the firmware inspects the Transport Status IU header in the Transport Status ACW and then stores ending I/O status in the subchannel 142. The firmware then generates an interrupt to the I/O processor (IOP) of the channel subsystem 114 informing the IOP that the I/O operation for subchannel has completed. The IOP then generates an interrupt back to the OS 110 informing the OS 110 that the I/O operation has completed.

FIG. 10 shows an embodiment of an Address Control Word (ACW) 210 that is set up by Firmware in the local channel memory and is used by the data router 160 to translate between HBA memory requests and host memory requests. After each host memory request is processed, the data router hardware updates information in the ACW 210 so as to be ready for the next HBA request using this ACW 210. An exemplary ACW 210 includes the following fields.

An ACW State field 250 (e.g., word 0 byte 0) provides the state of the ACW. For example, bit 0 (the ACW Valid bit) is set by firmware to one when the ACW is set up for an I/O operation, indicating that the ACW is a valid ACW. States are defined in, e.g., bits 4-7, and include the following codes:

0—Idle/Read setup. Firmware sets this state when the ACW has been set up to receive data;
1—Write setup. Firmware sets this state when the ACW has been set up to transmit data;
2—ACW IU Header Area Secure. The data router hardware changes the ACW state from state 0, 1 or 3 to state 2 when an entire IU Header has been transferred to or from the HBA for fetches or stores. When receiving data from the link, the entire IU Header must have been received and stored into the ACW header area before the ACW State 250 is set to state 2. The data router hardware does not access the IU Header Area in the ACW once the ACW State is set to 2. Once the ACW is set to State 2 it stays in State 2 until Firmware changes it. If no header data exists for the IU then Firmware may set the ACW State to state 2.
3—IU Header In Progress. Hardware sets state 3 from either state 0 or 1 when a PCIe request only transfers part of the IU Header. The ACW State stays in State 3 until subsequent PCIe requests completes the transfers of the entire IU Header, then the ACW State is set to state 2.

A Read discard or drop bit (e.g., bit 2 of the ACW State 250) may be set by the data router if an exception encountered when forwarding a host memory request to the host memory. For HBA store requests, the Read Discard bit is set so that all HBA requests to store data into the host memory will result in the data being discarded and also not accumulated in the Data Check Word Save Area 280. Conditions that set this bit include any exceptions received on host memory stores for this ACW and any time the HPF-DR Response Word 254 bit 8 ("a Missing PCIe Request") of this ACW is set to a one. For HBA fetch requests, the a Write Drop bit (e.g., ACW State 250, bit 3) may be set so that any HBA fetch requests for this ACW will receive a PCIe 'Transaction Layer Protocol' (TLP) Completion with the Completion Status set to Completer Abort. Conditions that set this bit are: any exceptions received on host memory fetch requests for this ACW; set by Global Fetch Quiesce hardware when requested by Firmware for this ACW.

In one embodiment, when an inbound HBA request is processed and a Firmware Read Discard bit 252 is set, the data router hardware sets the Read Discard bit to a one and the Missing PCIe Request bit to a one. The actions then taken by the data router hardware are listed in an HPF-DR Response Word (described below) under bit 8. Firmware uses this bit to recover an ACW which has a HBA store request stuck in the Store Array Queue 228 that can not be processed because a previous BHA request has not been received for this ACW.

An HPF-DR Response Word field 254 (e.g., word 0 bytes 1, 2, 3) includes a HPF-DR Response Word which is the ACW ending status information provided by the data router hardware to Firmware at the completion of an I/O operation. Examples of ending statuses and their corresponding exemplary bits include:

Bit 8—Missing HBA Request: This bit may be set to one when a "deferred" HBA store transaction for this ACW exceeded the configured 'Time To Live'. This occurs if the data router hardware had previously re-en-queued this HBA request because of an out of order condition, and the time that the request has been waiting in the Store Array Queue 228 for missing HBA requests to be received exceeded the configured Time To Live. This bit may also be set to one when an inbound HBA (read) request is processed and the ACW Firmware Read Discard bit is set to a one. Actions performed when the Missing HBA Request condition include storing the IU Header (if any) in the ACW, discarding IU data (if any) without accumulating it in the Data Check Word, and setting the Read Discard Bit 2 of the ACW State field 250 to a one. After these actions are performed, the Active Request Count for this ACW is decremented by one.
Bit 9—Memory Request Threshold exceeded: The number of host memory requests needed to satisfy one HBA request exceeded a set Memory request threshold.
Bit 10—TIDAL format check: The TIDA List address or a TIDAW did not conform to protocol format rules. The address of the failed TIDAW is written into the Failing zSeries Memory Address field of this ACW.
Bit 11—Overflow on Working count: When data is being fetched from or stored into host memory by the data router, and the total byte count of data, pad bytes and Data Check Words attempted to be transferred to or from the PCIe bus, exceeded the byte count of data specified by the ACW Working Count.
Bit 12—Duplicate HBA fetch request or an invalid HBA store request received from the HBA: A duplicated HBA fetch request will not be processed, instead a Completer Abort completion TLP will be returned to the HBA. The Write Drop Bit (ACW State Byte bit 3) is set to a one; or, for an invalid HBA store request, this bit and the Read Discard (ACW State Byte bit 2) is set to a one, and all subsequent HBA store requests for this ACW are discarded.
Bit 13—Active Request Count=Zero: Whenever the data router hardware updates the ACW Active Request Count in the ACW, it sets this bit equal to the NOR of all the bits of an Active Request Count field 290 defined below.
Bit 14—ACW Wrapped: This bit is set to a one when the 24 bit Next Expected 16 Meg Byte Offset field wraps from 0xFFFFFF to 0x000000. This ACW Wrapped bit being set to a one blocks the data router hardware from interpreting the 16 Meg Byte Offset values of 0x000000 to 0x00001F for this ACW as IU Header information.

Bit 15—TIDA fetch host memory error: This bit is set when all of the following statements are true: An exception or bad hardware response was received in response to a host memory fetch request for a TIDAW entry in a TIDA list; a HBA request for data was received from the HBA required this unavailable TIDAW; and no previous errors were detected for this I/O operation. The error indication received from the receive logic 240, is stored in the ACW TIDA Hardware Response field ACW word 9 bytes 2 and 3. The address that caused this error is written into the Failing zSeries Memory Address field ACW words 16 and 17.

Bit 17—Data Check Word mismatch: For stores to host memory, the computed Data Check Word did not match the received Data Check Word. Posted only if Data Check Word checking is enabled in the ACW by HPF-Control bit 3 and the Read Discard, bit 2, is not set to a one.

Bit 18—Direction error: The ACW Direction bit 0 in the HPF-DR Control Word did not match the direction of the HBA request for this ACW.

Bit 21—host memory Response Error: An error was received from a host memory request. In one embodiment, the error byte, detailing the error, from host memory Response is written into bits 19-20 above and bits 24-31 below of this ACW Status field. The host memory address which caused the error is written to the Failing zSeries Memory Address field of this ACW.

Bit 22—IU Header Data Check Word mismatch: Hardware checks the IU Header Data Check Word on the 28 bytes of IU Header information for all inbound IUs if not disabled by HPF-DR Control Word bit 16 in the ACW. If the IU Header Data Check Word fails, any data payload present in the IU is discarded.

If any of the above errors indicated in an ending status in an HPF-DR Response Word are encountered while storing data from the HBA to the host memory, the remaining bytes in the HBA request and all subsequent HBA requests for the IU are discarded. This is enforced with the Read Discard bit in the ACW State being set to a one when any one of the error bits 8-12, 15, 17, 18, 21, and 22 in this word are set to a one. If an error is detected while fetching data from host memory to transfer across the PCIe bus, the HPF-DR hardware will signal the PCIe output Logic 244 to return a Completion TLP with the Completion Status set to Completer Abort. This will cause The HBA to abort the exchange that initiated the host memory fetch request that caused the exception. All subsequent HBA requests to this ACW are responded with the same Completion TLP with the Completion Status set to Completer Abort. This is enforced with the Write Drop bit in the ACW State being set to a one when any one of the error bits 8-12, 15, 17, 18, 21, and 22 in this word are set to a one. If the HPF-DR hardware encounters an ACW with the Valid (Bit 0) set to 0, or with an invalid ACW State, (0 and 4-F for fetches, or 1 and 4-F for stores), a HPF-DR hardware Channel Control Check is posted.

Referring again to FIG. 10, the ACW may also include a Working Count field 256. This field is initialized from word 7 of the Starting Count field (described below) when the first HBA request for this ACW is processed by the data router. Data router hardware decrements this count as data is fetched or stored from or into host memory. Data is never stored into host memory after this count has decremented to zero. Any data received from the PCIe bus after this count goes to zero is dropped, and the 'Overflow on Working Count' bit is set to a one in the HPF-Response Word field. This count is not decremented for data bytes discarded or dropped if either the Write Drop or the Read Discard bit is set to a one in the ACW State byte. The residual value of this count is invalid if any error bit has been set to a one in the HPF-Response Word 254 that indicates an error was received in a host memory response.

A HPF-DR Control Word field 258 is set up by Firmware and controls the functions the data router performs. Exemplary functions (corresponding to exemplary bits in this field) are described as follows:

Bit 0—ACW Direction: Set to '1'b for a fetch from host memory. Set to '0'b for a store to host memory. This bit must match the HBA requests that reference this ACW otherwise 'Direction error' bit 18 in the HPF-DR Response Word is set to a one.

Bits 1-2—"IU Data—Data Check Word Select": These bits are encoded with the following code points to inform the data router hardware of the Data Check Word type for Data IUs If bit 3 below (Data Check Word is enabled) is set to a one, the following codes indicate the type of Data Check Word used:
  0—Use Data Check Word type 1. (LRC)
  1—Use Data Check Word type 2. (Check Sum)
  2—Use Data Check Word type 3. (CRC)
  3—Use Data Check Word type 4.

Bit 3—"IU Data—Data Check Word Enable": A value of '0'b indicates OFF, i.e., there is no Data Check Word checking/generation for this entry. A value of '1'b indicates ON, i.e., Data Check Word checking/generation per the encode of bits 1-2 above is enabled for this ACW.

Bits 4-5—IU Header Data Check Word Select encode: Bits 4-5 are encoded with the following code points to inform the data router hardware of the Data Check Word type for the IU Header if bit 16 below is set to a zero (IU Header Data Check Words are enabled):
  0—Use Data Check Word type 1. (LRC)
  1—Use Data Check Word type 2. (Check Sum)
  2—Use Data Check Word type 3. (CRC)
  3—Use Data Check Word type 4.

Bit 16—Suppress IU Header Data Check Word: A value of '0'b (OFF) indicates that IU Header Data Check Word checking/generation per the encode of bits 4-5 above is enabled for this ACW. A value of '1'b (ON) indicates that the Data Check Word field in inbound IU headers is not checked. The Data Check Word field in outbound headers is not modified and is sent as set up in the ACW.

Bit 17—BYPASS TIDAL: A value of '0'b indicated that TIDAL processing is to be used. The address in the ACW is the starting address of a list of TIDAWs. Each TIDAW has a host memory address and count that is used to fetch or store data. A value of '1'b indicates that TIDAL processing is bypassed, and data is fetched or stored contiguously starting at the host memory address in the ACW.

Bits 22-23—Payload Data Check Word Location: This two bit encode represents the number of words from the end of the payload where the Data Check Word is located for write operations. This encode is ignored for read operations. For encodes other than '00'b, the starting Working Count must be a multiple of 4 bytes (i.e. no pad). Words in the IU following the Data Check Word are not included in the Data Check Word calculation. Exemplary codes include:
  '00'b: Insert the generated Data Check Word when Working Count=0. This places the Data Check Word at the end of the transmitted IU plus pad bytes to put the Data Check Word on a word boundary. This code point is used for transmitting everything but the Transport Command IU.

'01'b: Overlay the existing word with the generated Data Check Word when the Working Count=4. This places the Data Check Word one word (4 bytes) from the end of the transmitted IU. This code point is only used for transmitting the Transport Command IU.

'10'b: Overlay the existing word with the generated Data Check Word when the Working Count=8. This places the Data Check Word two words (8 bytes) from the end of the transmitted IU. This code point is only used for transmitting the Transport Command IU.

'11'b: Invalid

Referring again to FIG. 10, the ACW may also include a Key 259 that is set up by Firmware. The Key is taken from the ACW and inserted by the data router hardware in the host memory request used to access host memory. A Zone ID field 260 is set up by Firmware, and is taken from the ACW and inserted by the data router hardware in the host memory request used to access host memory.

A Host Memory Address field 262 indicates the starting address in host memory where the data for this ACW is to be fetched from or stored into (e.g., if bit 17 of the Control Word field is one) or the starting address of the Tidal Indirect Data Address List (TIDAL) (e.g., if bit 17 is zero). The host memory address in the ACW is either the host memory Address of the Data or the address of the start of a Transport Indirect Address List called a TIDAL. Each entry in a TIDAL is a TIDAW that is the starting host memory Address for the number of bytes of data that is in the count field in the TIDAW. If a TIDAL is indicated by bit 17 in the HPF-DR Control Word then the HPF-DR hardware fetches the TIDAL from host memory then uses the address in each TIDAW to fetch or store data in host memory.

An IU Header Count field 263 is used by the data router hardware to track the number of IU Header bytes left to be transferred to or from the ACW from or to the PCIe bus. The IU Header Count is initialized by Firmware to the number of IU Header bytes to be transferred out of or into the ACW bottom to or from the PCIe bus at the beginning of the transmission or the reception of an IU.

A 24 bit "Next Expected 16 Meg Byte Offset" field 264 is initialized by Firmware when the ACW is set up. This Offset field, although described as a 16 Megabyte Offset, may be configured for other desired offset configurations. As each HBA fetch or store request is processed, the data router hardware will check the 16 Meg Byte Offset 180 in the HBA address against the Next Expected 16 Meg Byte Offset field in the ACW. If they match, the data router hardware moves the data, if it is the IU Header to or from the bottom of the ACW, and any customer data, to or from host memory. The data router hardware then increments the Next Expected 16 Meg Byte Offset field in the ACW by the HBA transaction size. In one embodiment, to make use of a 4 byte Working Count field, using a Next Expected 16 Meg Byte Offset field that is 3 bytes, the Next Expected offset may wrap from 0xFFFFFF to 0x000000 up to 255 times before the Working Count transitions to zero. The first time the Next Expected offset wraps, the ACW Wrapped bit (bit 14 in the HPF-Response Word field 254) is set to a one in this ACW.

A Starting Count field 266 is used by the Firmware to load the number of bytes of data to be transferred for the I/O operation under control of this ACW. This count does include all of the inserted pad and Data Check Word bytes on transmitted data but does not include the IU Header bytes or the finial pad and Data Check Word bytes on transmitted or received data. The data router hardware transfers this count to the Working Count field 256 when the first HBA request is processed for this ACW. The data router hardware does not modify the Starting Count in the ACW.

A CTL field 268 and a Validation field 270 are compared by the data router hardware with the corresponding CTL field 174 and Validation field 178 in the address field 172 received from the HBA. If they are not equal, an error is posted, and the host memory operation is not performed. This error results in a Channel Control Check.

For HBA stores, a Data Check Word State field 272 is used by the data router hardware to track which of the data bytes in the Last 4 Data Bytes Save Area (described below) in the ACW will be used for the Data Check Word calculation in the next transaction for this ACW. This is required for the case where a HBA store request did not end on a word boundary relative to the beginning of the data transfer and the calculation of the Data Check Word can only be done on four byte words of data on word boundaries. Therefore up to three bytes of previously received data and the boundary state information must be saved in the ACW, until the subsequent bytes of data are received, to continue the calculation of the Data Check Word.

A TIDAL Hardware Response field 274 is used to store a host memory exception or a bad data router hardware response that is received for a fetched TIDA List. Bits 2-15 of this field have the same definition as bits 18-31 of the HPF-DR Response Word field 254. Because the TIDA List may be pre-fetched by the HPF-DR hardware before its use is required, this bad response will not be reported as an error by Firmware unless a HBA request is received from the HBA to transfer data that would have used this unavailable TIDAW. This latter condition is indicated to Firmware by bit 15 of the HPF-DR Response Word field 254.

A Previous Data Check Word Save Area is used by the data router hardware to save that next to last interim Data Check Word value at the end of each HBA store transaction. This interim value is not modified by calculations using the last 4 data bytes received. Thus, if the current HBA transaction completes the operation, this field contains the final calculated Data Check Word value for the operation and the last 4 data bytes received is the received Data Check Word which is saved in the following field in this ACW.

A Last 4 Data Bytes Save Area 278 is used by the hardware to store the last 4 data bytes received on each HBA request. For HBA requests other than the last, up to three of these bytes may be required for subsequent Data Check Word accumulation if the current HBA request did not end on a word boundary. Information as to which bytes are needed is recorded in the Data Check Word State 272. For the last HBA request, this field contains the received Data Check Word. In one embodiment, for HBA PCIe fetches, this field holds up to the last four data bytes based on the last previous 4 byte PCIe boundary. So if the PCIe address ends with 1, this field holds the last byte transmitted. If the PCIe address ends with 2, this field holds the last two bytes transmitted and so on up to the last four bytes.

Data Check Word Save Area 280 is used by the data router hardware at the end of each HBA transaction (fetch or store) to save the interim calculated Data Check Word value, which is used to seed the next transaction for this ACW.

A TIDAL Work Area Address 282 is an address of a 256 byte work area that is located in the Local Channel Memory, and is used by data router hardware to buffer TIDA List elements pre-fetched from host memory by the data router hardware. Firmware sets this field to point to the assigned area for this ACW. A TIDAL Work Area Index 284 is the index into the Local Channel Memory TIDAL Work Area which points to the current active TIDAW entry and is maintained by the data router hardware.

A Data Check Word Seed field 286 is used by the Firmware to write the initial Data Check Word Seed value in this word. This word is used as the starting seed for the Data Check Word computations both at the beginning of the data transfer for this ACW on reads and writes, and also for 're-seeding' following the processing of the 'Insert Data Check Word' TIDAW flag in a TIDAW when that TIDAW count transitions to zero for writes. For the Transport Command ACW, Firmware takes the original seed for the Transport Command IU and calculates a new value for the Transport Command IU ACW seed by updating the starting Data Check Word seed for the Transport Command IU with the IU Header and the Write and or Read length field(s) that are at the end of the Transport IU. Thus the Transport Command IU Data Check Word covers the entire Transport Command IU even though the data router hardware takes the Seed from the ACW, and only calculates the Data Check Word on the Transport Command IU data portion of the IU. The data router hardware then inserts the Data Check Word into the IU and then transmits the Write or the Read length field or if the I/O operation transfers data in both directions then both the Write and Read length fields are transmitted.

A Failing zSeries Memory Address 288 is used to store an address of a memory area that caused an exception, and the appropriate error bits are set in the HPF-DR Response Word 254.

An Active Request Count counter 290 is used by the ACW to keep track of how many HBA requests currently resides in the Store Array Queue 228 for this ACW. This counter is increments for every HBA request that is stored into the Store Array Queue for this ACW and is decremented when the HBA request has been processed. A HBA request for this ACW is considered processed when one of the following occurs to the request: all of the host memory requests for a HBA request has completed with a host memory response; all data for the HBA request has been dropped if the Read Discard bit, bit 2, was set to a one; or all of the IU Header information is stored in the ACW for a HBA request that only contains IU header information. Whenever the data router hardware updates the ACW Active Request Count in the ACW, it sets the Active Request Count=Zero (HPD-DR Response Word 254, bit 13) to the NOR of the bits of the Active Request Count. Thus, when the HPF-DR hardware decrements the Active Request Count to 0, the Active Request Count=Zero bit will be set to a one.

An IU Header Information field 292 is used to store command, status and/or data IU headers used in the I/O operation. In one embodiment, this field is an area for 8 words of 'IU Header' Information. IU Header information is the first data transferred to or from a device in an IU on the Link if the IU contains an IU Header. The IU Header information is used or generated by the channel but is not part of the data to be stored or fetched into or from host memory. Therefore this information is checked or generated by the channel microprocessor firmware. The bottom 8 words of the ACW control block is used to buffer the IU Header and used as the interface between the data router hardware and Firmware for the IU Header.

The IU Header information is the first data transferred across the PCIe bus when the ACW is a Read Data ACW or a Write Data ACW. When the data router hardware completes the transfer of the IU Header, it changes the ACW State field 250 value to 2. For IU transmissions, Firmware builds the IU Header in the ACW prior to signaling the HBA to transmit the IU. For received IUs, Firmware inspects the IU Header in the ACW when it has been notified by the HBA that an I/O operation has completed and has verified that the ACW is in ACW State 2.

Firmware also controls whether the last word of the IU header, which in the present embodiment is always at 16 Meg Byte Offset 28, 0x00001C, represents data or an IU Header Data Check Word for the IU Header. The HPF-DR Control bit 16 (the Suppress IU Header Data Check) informs the data router hardware if the Data Check Word for IU headers is to be generated or checked. If enabled the data router hardware generates the IU Header Data Check Word, and then replaces the last word of the IU Header from the ACW with the generated Data Check Word, as the IU Header is being sent to the HBA. If enabled the data router hardware checks the Data Check Word on the received HBA IU header and reports the results in the HPF-DR Response Word 254 at bit 22.

Firmware may set up the ACW so that the data router hardware transfers less than 8 words of IU Header information. It does this by adjusting the State, Header Count, Next Expected 16 Meg Byte Offset and the initial 16 Meg Byte Offset used by the PCIe HBA such that the last IU Header word to be transmitted or received is at the 16 Meg Byte Offset of 28, 0x00001C and the first byte of payload (if any) is at a 16 Meg Byte Offset of 32, 0x000020. The IU Header is always an integral number of words.

In one embodiment, if an IU Header is not required for an IU then Firmware set up the ACW as follows:
1. Set the ACW IU Header Count to zero. ACW Word 6 byte 0;
2. Set the ACW State to state 2;
3. Set the ACW wrapped bit to a one (HPF-DR Response Word bit 14), set the starting 16 Meg Byte Offset to 0x000000 in the Address Control Structure given to the HBA and set the same value into the Next Expected 16 Meg Byte Offset field in the ACW;
4. Set the ACW Working Count 256 to equal the ACW Starting Count 266;
5. Set the ACW Data Check Word State to a value of 0x00; and
6. Set Previous Data Check Word Save Area 276 and the Data Check Word Save Area 280 equal to the Data Check Word Seed 286. Now it appears to the data router hardware that the IU Header has been received or transmitted for the IU this ACW is assigned to.

Some of the fields in the ACWs described above are set up by the channel microprocessor based on information derived from the receipt of an I/O instruction. Exemplary fields include the ACW State field, the Response Word field, the HPF-DR Control field, the host memory or TIDA memory address field, the Header Count, the "Next Expected 16 Meg Byte Offset field, the D field, the CTL field, the Validation field, the TIDAL Work Area Address field, the Data Check Word Seed field, and the IU header field. The other fields in the ACW are control fields used by the HPF-DR hardware in executing the I/O operation and for presenting ending status information back to Firmware after the I/O operation has completed.

Figure 11:
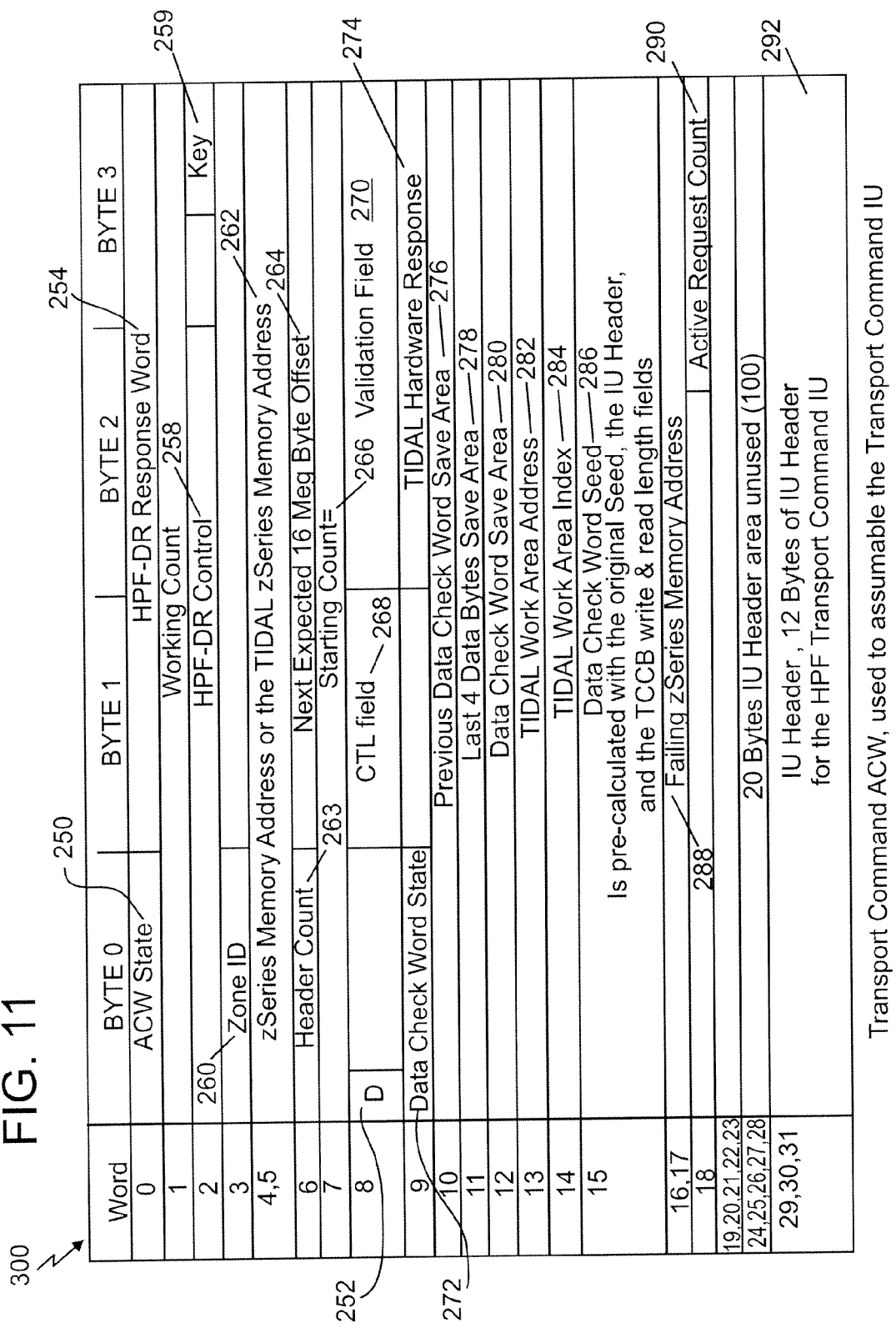
FIG. 11 depicts an embodiment of the ACW of FIG. 10.

FIGS. 11-14 illustrate exemplary values set by the Firmware in ACWs that are stored in the local channel memory and used by the data router hardware. Referring to FIG. 11, to generate a Transport Command ACW 300, which is used by the HPF-DR to assemble a Transport Command IU, the following settings are applied:
1) For the ACW State field, the ACW valid bit set to a one and a State encode of 1 is set;
2) The ACW Wrapped field is set to a zero (Set when the HPF-DR response Word is set to 0x000000);
3) For the HPF-DR Control field, the following values are set:

Bit 0 (ACW Direction is set to a one. Data is being transmitted from the channel;
Bits 1-2 (IU Data—Data Check Word Select) is set to a '00'b to indicate LRC words are being used;
Bit 3 (IU Data—Data Check Word Enable) is set to a one;
Bits 4-5 (IU Header Data Check Word Select) are not used;
Bit 16 (Suppress IU Header 'Data Check Word) is set to a one;
Bit 17 (Bypass TIDAL) is set to the inverse of TCCB TIDAL flag bit in the TCW;
Bits 22-23 (Payload Data Check Word Location) are set with a code value of '10'b;
4) The Key value is taken from the subchannel;
5) The host memory Address is taken from the TCW;
6) The IU Header Count is set at 0x0C for a Transport Command ACW;
7) The Next Expected 16 Meg Byte Offset field is set at 0x000014 for a Transport Command ACW;
8) The Starting Count field value is translated from the TCW;
9) The Firmware Write Drop Bit (D) is set to zero when the ACW is set up;
10) The CTL field is set to a 0x02 for all Transport ACWs;
11) The Validation Field is set to a unique value for this ACW at channel initialization;
12) The TIDAL Work Area Address is set to a unique value for this ACW at channel initialization;
13) Data Check Word Seed: For the Transport Command ACW, Firmware takes the original Transport Command Seed, calculates a new seed value for the data router hardware from the IU Header 101 data setup in this ACW and the Write & Read length fields derived from the TCW; and
14) The IU Header 101: The 12 bytes of IU header 101 are set up from the Subchannel and the TCW.

Figure 12:
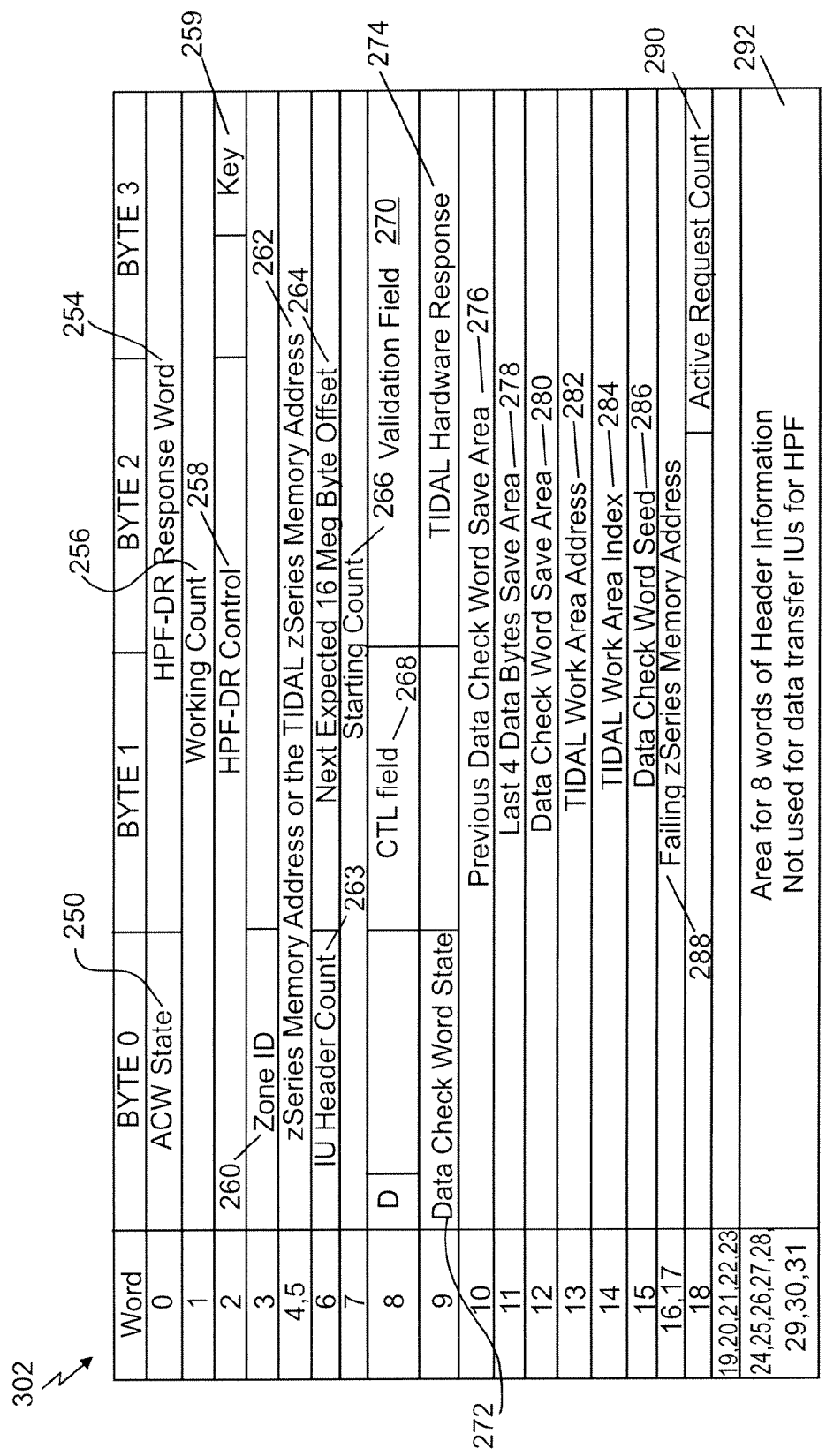
FIG. 12 depicts an embodiment of the ACW of FIG. 10.

Referring to FIG. 12, a Transport Read Data ACW 302 is used by the data router to receive a read transport-data IU and generate a host memory command to transfer read data to the host memory. The Transport Read ACW is generated by applying the following settings:
1) For the ACW State field, the ACW valid bit set to a one and a State encode of 2 is set;
2) The ACW Wrapped field is set to a one when the HPF-DR Response field is set to 0x020000);
3) For the HPF-DR Control field, the following values are set:
Bit 0 (ACW Direction is set to a zero. Data is being received at the channel;
Bits 1-2 (IU Data—Data Check Word Select) are set to a '10'b to indicate CRC words are being used;
Bit 3 (IU Data—Data Check Word Enable) is set to a one;
Bits 4-5 (IU Header Data Check Word Select) are not used. The ACW Wrapped bit above is set;
Bit 16 (Suppress IU Header 'Data Check Word) is not used. The ACW Wrapped bit above is set;
Bit 17 (Bypass TIDAL) is set to the inverse of TIDAL Read flag bit in the TCW;
Bits 22-23 (Payload Data Check Word Location) is set with a code value of '00'b, as it is not used for this ACW;
4) The Key value is taken from the subchannel;
5) The host memory Address is taken from the TCW;
6) The IU Header Count is set at 0x00 for a Transport Read Data ACW;
7) The Next Expected 16 Meg Byte Offset field is set at 0x000000 for a Transport Read Data ACW;
8) The Starting Count field value is taken from the Read data count in the TCW;
9) The Firmware Write Drop Bit (D) is set to zero when the ACW is set up;
10) The CTL field is set to a 0x02 for all Transport ACWs;
11) The Validation Field is set to a unique value for this ACW at channel initialization;
12) The TIDAL Work Area Address is set to a unique value for this ACW at channel initialization; and
13) The Data Check Word Seed is set to 0xFF FF FF FF for a Transport Read Data ACW.

Figure 13:
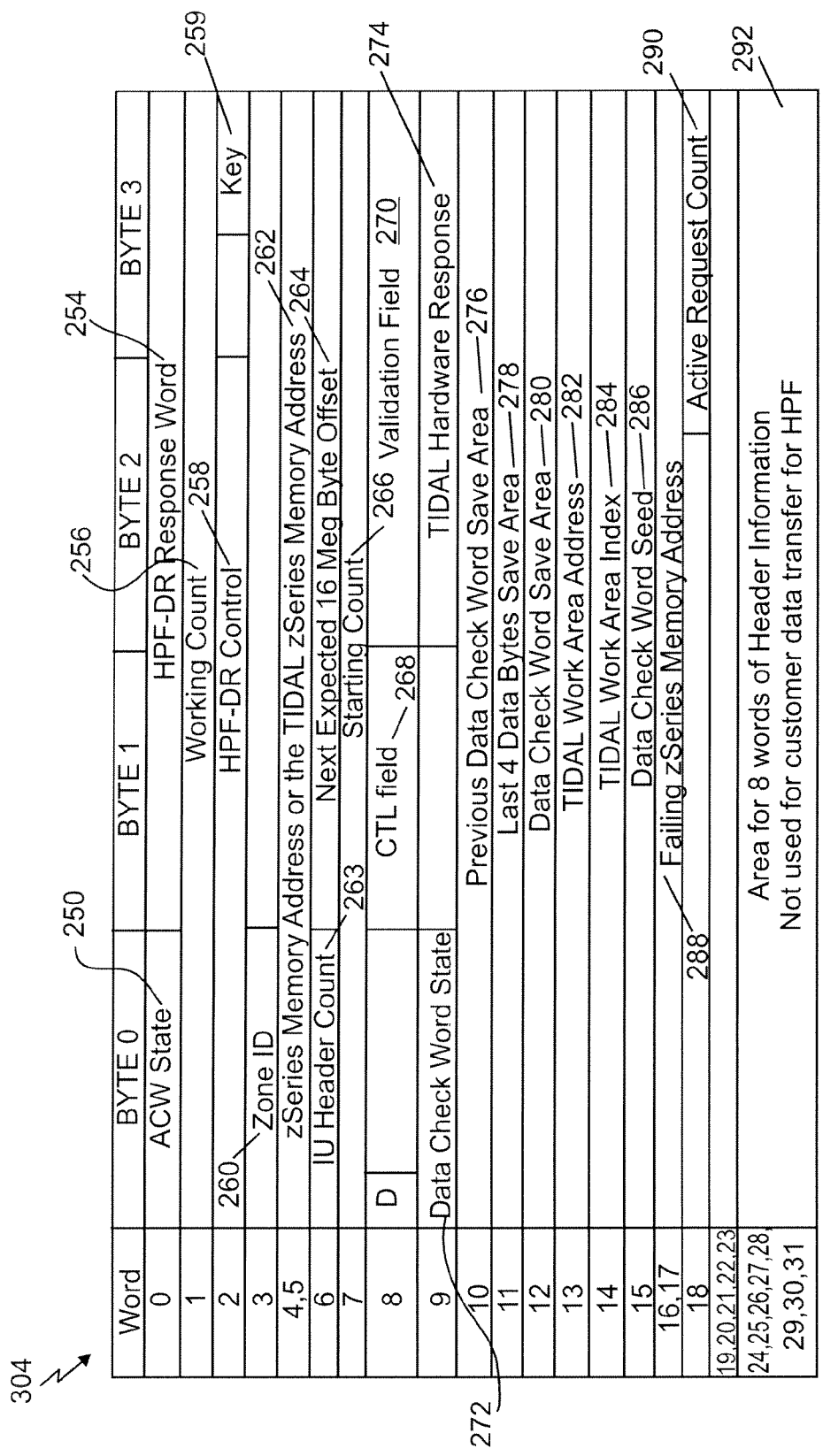
FIG. 13 depicts an embodiment of the ACW of FIG. 10.

Referring to FIG. 13, a Transport Write Data ACW 304 is used by the data router to generate a write transport-data IU to transfer write data to the control unit. The Transport Write ACW is generated by applying the following settings:
1) For the ACW State field, the ACW valid bit set to a one and a State encode of 2 is set;
2) The ACW Wrapped field is set to a one when the HPF-DR Response field is set to 0x020000;
3) For the HPF-DR Control field, the following values are set:
Bit 0 (ACW Direction) is set to a one. Data is being transmitted to the control unit;
Bits 1-2 (IU Data—Data Check Word Select) are set to a '10'b to indicate CRC words are being used;
Bit 3 (IU Data—Data Check Word Enable) is set to a one;
Bits 4-5 (IU Header Data Check Word Select) are not used. The ACW Wrapped bit above is set;
Bit 16 (Suppress IU Header 'Data Check Word) is not used. The ACW Wrapped bit above is set;
Bit 17 (Bypass TIDAL) is set to the inverse of TIDAL Read flag bit in the TCW;
Bits 22-23 (Payload Data Check Word Location) is set with a code value of '00'b;
4) The Key value is taken from the subchannel;
5) The host memory Address is taken from the TCW;
6) The IU Header Count is set at 0x00 for a Transport Write Data ACW;
7) The Next Expected 16 Meg Byte Offset field is set at 0x000000 for a Transport Write Data ACW;
8) The Starting Count field value is taken from the write data count in the TCW;
9) The Firmware Write Drop Bit (D) is set to zero when the ACW is set up;
10) The CTL field is set to a 0x02 for all Transport ACWs;
11) The Validation Field is set to a unique value for this ACW at channel initialization;
12) The TIDAL Work Area Address is the same as the Work Area as the Transport Command ACW; and
13) The Data Check Word Seed is set to 0xFF FF FF FF for a Transport Write Data ACW.

Figure 14:
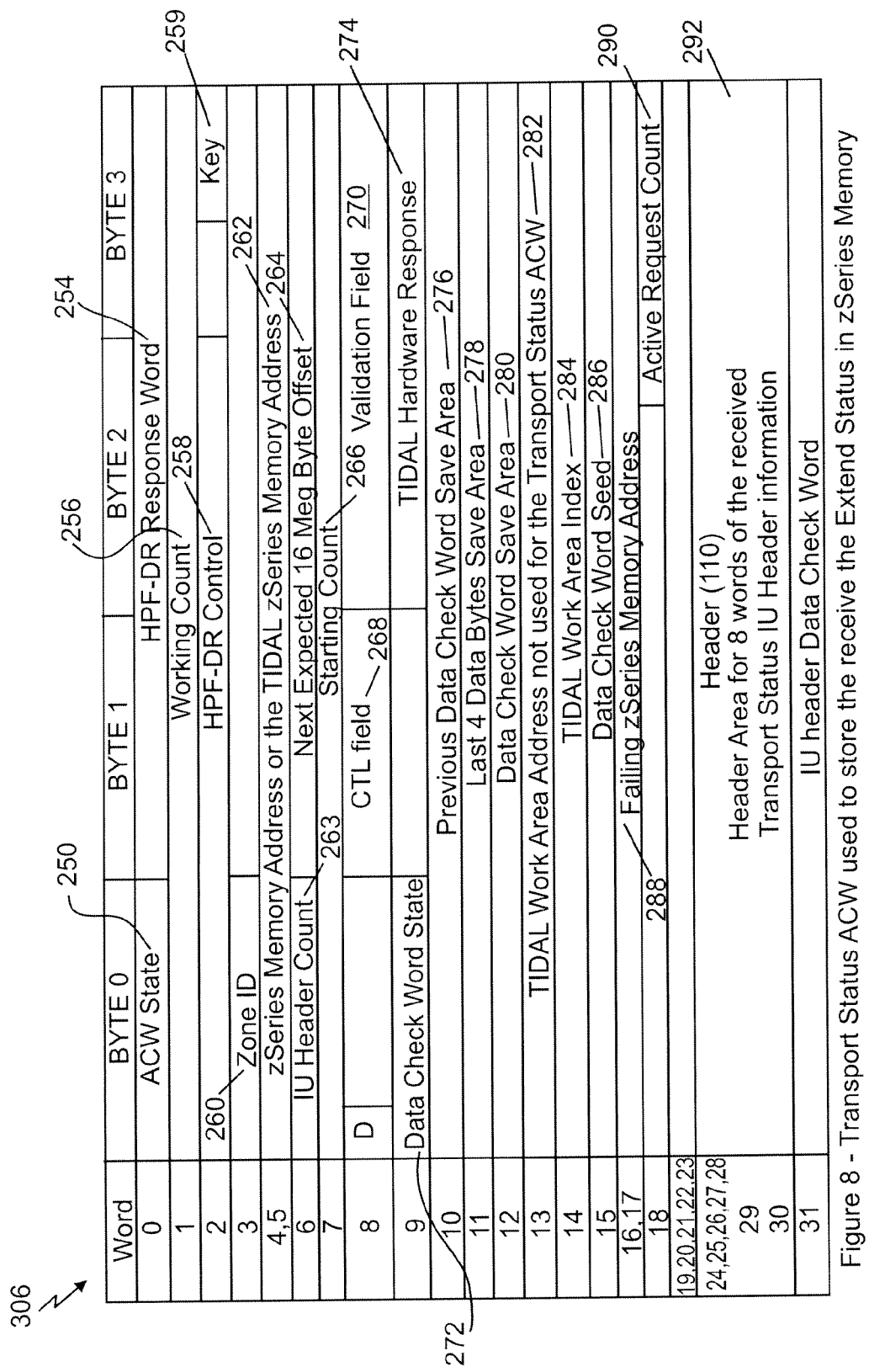
FIG. 14 depicts an embodiment of the ACW of FIG. 10.

Referring to FIG. 14 a Transport Status ACW 306 is used by the data router to store the extended status data from the received Transport Status IU and forward the status to the host memory. The Transport Status Block ACW is generated by applying the following settings:
1) For the ACW State field, the ACW valid bit set to a one and a State encode of 0 is set;
2) The ACW Wrapped field is set to a zero when the HPF-DR Response field is set to 0x000000;
3) For the HPF-DR Control field, the following values are set:
Bit 0 (ACW Direction) is set to a zero. Data is being received from to the control unit;
Bits 1-2 (IU Data—Data Check Word Select) is set to a '00'b to indicate LRC words are being used;
Bit 3 (IU Data—Data Check Word Enable) is set to a one;
Bits 4-5 (IU Header Data Check Word Select) is set to a '00'b to indicate LRC words are being used;
Bit 16 (Suppress IU Header 'Data Check Word) is set to a zero, the IU header Data Check Word is not suppressed;
Bit 17 (Bypass TIDAL) is set to a one, as indirect addressing is not used;

Bits 22-23 (Payload Data Check Word Location) is set with a code value of '00'b, and is not used for this ACW;
4) The Key value is set to 0x0 for this ACW;
5) The host memory Address is taken from the TCW;
6) The IU Header Count is set at 0x20 for a Transport Status ACW;
7) The Next Expected 16 Meg Byte Offset field is set at 0x000000 for a Transport Status ACW;
8) The Starting Count field value is set to 0x40 per the Fibre Channel architecture;
9) The Firmware Write Drop Bit (D) is set to zero when the ACW is set up;
10) The CTL field is set to a 0x02 for all Transport ACWs;
11) The Validation Field is set to a unique value for this ACW at channel initialization; and
13) The Data Check Word Seed is set to 0xA5 5A A5 5A for a Transport Status ACW.

Referring to FIG. 15, examples of the HBA address portion of various types of Address Control Structures are described. In these examples, when the CTL field 174 is equal to 0x02, the 16 Meg Byte Offset 180 is the only part of the HBA address 172 that increments on consecutive HBA requests from the HBA for an I/O operation. The first 32 bytes of data a HBA requests for an Information Unit (IU) to be transmitted or received may be IU header information that is retrieved from or stored into the bottom of the ACW control block. The data router hardware either fetches or stores this information from or into the bottom of the ACW for PCIe 16 MEG Byte Offset addresses ranging from 0x000000 to 0x00001F. This allows up to a 32 byte IU Header to be appended to, or striped off of the transport-data IU that is transmitted to or received from a device. When the 16 Meg Byte Offset wraps, it wraps back to 0x000000, but for this case, because it is a wrap condition and the ACW Wrapped bit is set to a one in the ACW, the received or transmitted data continues to be stored or fetched from host memory and not into or out of the ACW. Firmware has the ability to set up the ACW so that IU Header information is not fetched from or stored into the ACW if no IU Header information is present at the beginning of an IU. The ACW wrapped bit is bit 14 in the HPF-DR Response Word field of the ACW.

For a Transport Command Address Control Structure, the byte count derived from the TCW never causes the 16 Meg Byte Offset field 180 to wrap, therefore just one Address Control Structure is required for the data router hardware and HBA to transmit the Transport Command IU. The direction of the Command IU is always from the channel side HBA to the control unit.

For a Transport Status Address Control Structure passed to the HBA, the byte count never causes the 16 Meg Byte Offset field to wrap, therefore just one Address Control Structure is required for the data router hardware and HBA to receive the Transport Status IU. The direction of the Status IU is always from the control unit to the channel side HBA.

For Transport Read Data Address Control Structure(s), the total amount of read data to be transferred from a device to the HBA is provided by a Read Data Count in the TCW. If the Read Data Count is larger then 16 megabytes, then the number of Data Address Control Structures passed to the HBA to transfer the read data is the total Read Data Count divided by $2^{23}$, and rounded up by one if there is a remainder. Each read Data Address Control Structure passed to the HBA has the same 64 bit PCIe address. The count field in each Data Address Control Structure is $2^{23}$ except for the last Data Address Control Structure that completes the I/O data transfer. This makes it appear to the data router hardware that the $2^{23}$ Meg Byte Offset field keeps wrapping from 0x7FFFFF to 0x000000. The host memory address is either the ever increasing host Memory Address 262 from the ACW or the host memory address from each TIDAW from a TIDAL addressed by the Memory Address 262.

For Transport Write Data Address Control Structure(s), the total amount of write data to be transferred from the HBA to the device is provided by a Write Data Count from the TCW. The number of Address Control Structures for a Transport Write IU is calculated in the same way as for the Read Data Address Control Structures.

The systems and methods described herein provide mechanisms for checking data processed by the data router 160 for errors. For example, the data router 160 checks a variety of reference points whenever a HBA 154 references the host memory. In one example, the data router 160 checks that an ACW address location in the ACW Index field 176 of an HBA address field 172 is within the memory area bounded by the ACW Origin register 214 and the ACW Limit Register 216.

In another example, the data router 160 checks that the HBA 154 is using the correct ACW for a HBA request by checking that the CTL field and Validation field in the HBA address field 172 match the CTL field and Validation field in the ACW referenced by the HBA request. If these fields do not compare then the channel 128 will end the I/O operation with a Channel Control Check. The data router 160 also checks that the Offset field in the address field 172 (e.g., the low order 24 bits of the HBA address) is equal to the Next Expected 16 Meg Byte Offset in the fetched ACW.

The Data Router 160 also includes the ability to generate or check Data Check Words (e.g., LRC, CRC) that allows the data router 160 to detect if data being transferred has been corrupted.

For example, as the data router gathers data from the host memory to be sent to the HBA 154, such as a TCCB 148 or output data, the data router generates a data check word 192 using the Data Check Word seed in the Transport Command ACW and using the TCCB data, and inserting the Data Check Word in the Transport Command IU (e.g., at two words from the end of the IU). The Data Check Word Seed in the Transport Command ACW was pre-calculated by Firmware with the Transport Command IU header and the Length fields. This allows the Data Check Word to cover the entire Transport Command IU including the length fields that follow the Data Check Word in the transmitted IU.

In one embodiment, the Data Check Word is always calculated on a word boundary. If the byte count of the number of bytes of data covered by the Data Check Word is not a multiple of 4, then pad bytes are required to pad to a word boundary before the Data Check Word is transmitted. For transmit to the control unit 118, the pad bytes are always zeros. For receive to the host memory, any value of the pad bytes must be accepted. The pad bytes are included in the Data Check Word calculation.

The data router 160 also generates a Data Check Word that checks the entire Transport Write Data IU during transmission across the channel path. This Data Check Word is generated starting with the Data Check Word seed in the Transport Write ACW, and as the Data is being fetched from the host memory, a new Data Check Word is calculated with the fetched data. When all of the data is fetched and transmitted then the resultant Data Check Word is appended and aligned with pad bytes to a word boundary, such as the last 4 bytes of data sent to the HBA. A TIDAW word may have an insert Pad and Data Check Word flag bit set to a one which will cause the data router hardware to insert an intermediate Data Check Word in the Transport write data IU. The control unit will compare the received Data Check Word(s) with its own calculated Data Check Word(s) to verify that the received data IU is valid. For fetches from host memory, the calculated Data Check Word is always inserted and transmitted, after pad bytes on a word boundary, when the TIDAW count decrements to zero and the TIDAW insert Data Check Word Flag bit is set to a one.

The data router 160 may also generate a Data Check Word that checks the Transport Read Data IU that was transmitted across the channel path. The Data Check Word is calculated starting with the Data Check Word seed in the Transport Read ACW and then, as the input data is being stored in the host memory, an updated Data Check Word is calculated with the read data. When all of the data has been received and stored into the host memory, the resultant calculated Data Check Word is compared to the received Data Check Word from the device. The calculated Data Check Word comparing with the received Data Check Word verifies that the received data IU is valid. If the two fields do not compare then the I/O operation is terminated with an Interface Control Check. For example, at the end of receiving a data IU, if the 'Data Check Word Enable' bit 3 is set to a one, and if the expected Data Check Word does not match the received Data Check Word then the data router hardware will set 'Data Check Word mismatch' bit 17 to a one.

In one embodiment, when the data router 160 is receiving data from a device, there are instances that the data router 160 has to contend with in determining when the Data Check Word has been received. For example, a count match is performed to verify that the Data Check Word is the 4 bytes received after the ACW Working Count transitions to zero plus the pad bytes to put the Data Check Word on a word boundary. No extra data can be received after the Data Check Word has been received otherwise bit 11 of the HPF-DR Response Word (Overflow on Working count) will be set to a one.

In another example, if the ACW Working Count has not transitioned to zero at the time the control unit 118 send the Transport Status IU, an "early end" condition is encountered. For this case when the channel 128 is interrupted with the I/O completion by the HBA 154, the channel 128 first verifies that the Active Request Count=Zero bit is set to a one for the corresponding ACW and then verifies that the Data Check Word is correct by comparing the 'Last 4 Bytes Save Area' in the ACW which is the received Data Check Word to the 'Previous Data Check Word Save Area' in the ACW which contains the calculated Data Check Word on the received data.

The data router hardware also calculates the Data Check Word that checks the Transport Status IU data received from the Link. The Data Check Word is calculated starting with the Data Check Word seed in the Transport Status ACW and as the Transport Status IU data is being stored in host memory the new Data Check Word is calculated. When all of the data for the IU has been received and stored into host memory the resultant calculated Data Check Word is compared to the received Data Check Word from the device. The calculated Data Check Word comparing with the received Data Check Word verifies that the received data IU is valid. If the two fields do not compare the I/O operation is terminated with an Interface Control Check.

The architecture of TIDAWs and its T-TIC flag bits, allows the number of z Series Memory Requests needed to satisfy one PCI Express bus (PCIe) request of 4 k bytes to be over 12 thousand zSeries Memory requests. This occurs if the byte count field in each TIDAW and the T-TIC flag bit were each set to a one causing each TIDAW to be followed by a Transport-Transfer in Channel Word which is a new zSeries Memory address of the next TIDAW. The amount of time for the data router hardware to make all of these zSeries Memory requests may exceed the timeout value the HBA uses for one HBA request. The resulting error would look like a zSeries Memory timeout indicating that the zSeries Memory subsystem lost the zSeries Memory request.

To put a limit on the number of host memory requests required to satisfy a HBA request a programmable request threshold counter in the data router hardware may limit the number of host memory request used to satisfy one HBA request. If the limit is reached then the "Memory Request Threshold Exceeded" (HPF-DR Response Word bit 9) is set to a one. This threshold counter is set up when the channel hardware is initialized.

As described above, the HBA 154 is given the capability to directly store or fetch customer data into or out of host memory to improve the performance of the channel. However, all communications between Firmware running on the microprocessor 130 and the HBA 154 are performed through the local channel memory 132. The microprocessor 130 passes work to the HBA 154 by storing all of the required information for the HBA 154 to process an I/O operation on a HBA work queue in the local channel memory region 164. Likewise when the HBA has completed an I/O operation or the I/O operation failed, the HBA returns the I/O operation with status back to the channel in a firmware I/O completion queue in the local channel memory 132.

The following rules on ACW tenure and ACW atomicity are provided for the proper interaction of firmware, the HBA 154 and the data router hardware using ACWs 210 to process the HBA host memory requests.

During an I/O operation, the channel firmware owns the four ACWs (i.e., the Transport Command ACW, the Transport Read ACW, the Write Data ACW and the Transport Status ACW) specified for an I/O operation up to the time the firmware en-queues the I/O operation on the HBA work queue. The data router 160 and indirectly the HBA 154 own the four ACWs for an I/O operation from the time the channel firmware en-queues the I/O operation on the HBA work queue until the HBA 154 returns the I/O operation (an the four associated ACWs) with status back to the firmware on the firmware I/O completion queue. For I/O operations that complete successfully, the HBA 154 returns the I/O operation back to firmware on the firmware I/O completion queue after the HBA 154 has received and processed the Transport Status IU that ended the I/O operation. Firmware does not update any field in any of the four ACWs during the interval during which the data router hardware and the HBA 154 owns the four ACWs, except for rare cases (e.g., setting of the Firmware Read Discard bit in the ACW to a one).

In order to quiesce an ACW that is under control of the data router 160 to transmit data to a device, the firmware uses Fetch Quiesce hardware and logic 310 (shown in FIG. 9). In order to quiesce an ACW that is under control of the data router 160 to receive data from a device, the firmware uses the Firmware Read Discard Bit 252 and Store Quiesce hardware and logic 312 (shown in FIG. 9).

In one embodiment, atomicity rules are provided so that the IU Header and all state fields in the ACW have been updated by the time Firmware receives the ending completion status from the HBA 154 on the firmware I/O completion queue, which returns ownership of the ACWs for that I/O operation back to the firmware. A first rule states that the data router hardware must have stored the entire IU Header information into the ACW before the ending completion status id received or the ACW State for that ACW is changed to state 2 (i.e., ACW IU Header Area Secure). The Firmware Read Discard bit in the ACW is designed such that it can be set to a one by Firmware without affecting data router hardware working with and updating any fields in the same ACW.

A second rule states that, when the data router hardware sends a PCIe 'Transaction Layer Protocol (TLP) Completion with the Completion Status set to Completer Abort' to a HBA 154, the data router hardware must insure that all pending updates to the corresponding ACW are completed before any following HBA requests to store into Local Channel Memory are processed. A third rule states that, when two back to back HBA requests arrive at the Routing Logic 222, and the first request is routed to the Store Array Queue 228, and the second request is routed to Local Channel Memory, the Active Request Count and the Active Request Count=Zero bit in the ACW must be updated by the data router hardware before the second or a subsequent HBA request is routed and stored into Local Channel Memory.

Situations exist (e.g., when an error occurs) where Firmware cannot wait for an I/O operation to complete but instead must block new HBA data fetch requests from being fetched from host memory or to block data from HBA data store requests from being stored into host memory. The Global Fetch Quiesce hardware 310 provides the means for Firmware to Quiesce an ACW owned by the data router hardware and actively fetching data from host memory.

To Quiesce an active ACW that is set up to fetch data from the host memory, Firmware sets the ACW Index Register in the Global Fetch Quiesce logic 310 with the index of the ACW that Firmware requires to be stopped. After Firmware writes the ACW Index register, the Global Fetch Quiesce logic 310 performs the following operations:

1. A Quiesce busy bit in the Global Fetch Quiesce logic is set to a one which stops the Fetch Hardware 230 from processing any new HBA fetch or write request from the Fetch Array Queue 226, and stops the host memory fetch or write requests queued in the Fetch hardware 230 from being transferred to processing logic 234 for transmission to the host memory. However, the host memory fetch requests already queued and currently being processed at the processing logic 234 and the transmit logic 236, or at the receive logic 240 and routing logic 242, are not affected;
2. Host memory fetch requests that have been queued in the Fetch hardware 230 are scrubbed and any host memory fetch requests with the targeted ACW index in the Fetch hardware 230 are marked so as to force a TLP Completion with the Completion Status set to Completer Abort when the host memory request is later processed;
3. The Write Drop Bit, ACW State 250 bit 3, is set to a one in the targeted ACW;
4. The data router hardware is then unfrozen and the host memory fetch requests queued in the Fetch hardware 230, and the HBA fetch requests queued in the Fetch Array Queue 226 are now processed; and
5. The Quiesce busy bit in the Global Fetch Quiesce logic is reset.

After Firmware sets the ACW Index Register in the Global Fetch Quiesce logic 310, Firmware monitors the Quiesce Busy Bit to determine when the Global Fetch Quiesce logic 310 has completed the quiesce operation. Once the quiesce operation has completed, Firmware can depend on the following:

1. Any host memory fetch requests queued in the Fetch hardware 230, with the index of the targeted ACW, will receive a TLP Completion with the Completion Status set to Completer Abort status.
2. Any HBA requests queued in the Fetch Array Queue 226, or any new HBA requests from the HBA for the targeted ACW will be responded to with a TLP Completion with the Completion Status set to Completer Abort as a result of the Write Drop Bit, ACW State 250 bit 3, being set to a one in this ACW.

When the HBA 154 receives the TLP Completion with the Completion Status set to Completer Abort, the HBA 154 sends an abort for the I/O operation to the control unit 118 and device 116. When the HBA 154 has received a response from the device 116 completing the abort sequence, the HBA 154 will return that I/O operation back to Firmware through the Firmware I/O completion queue in Local Channel Memory.

Situations may also exist where Firmware has a requirement to block (quiesce) any new HBA data store requests from being stored into the host memory for an I/O operation. This capability is provided for by the Firmware Read Discard Bit. Firmware sets the Firmware Read Discard Bit 252 in the ACW to one then all new and existing HBA requests queued in the Store Array Queue 228 will be discarded by the Store hardware 232.

Along with having the data router 160 discarding HBA store requests for an ACW, Firmware may also have the capability to determine when all previous host memory store requests made by the Store Hardware 232 to the host memory for an ACW have completed with a host memory completion response. The host memory completion responses are received at the routing logic 242 and routed to the requester that made the requested and then processed in the same order the requests were made, which includes decrementing the counters in Global Store Quiesce Logic 312. The Global Store Quiesce logic and hardware 312 provides the means for Firmware to know when all previous host memory store requests made by the Store Hardware 232 to the host memory have completed.

Once the Read Discard bit is set to a one in an ACW, then a way to know that all previous host memory store requests have completed for that ACW is to wait until all current HBA store requests queued in the host memory pipeline (represented by processing logic 234, transmit logic 236, receive logic 240 and routing logic 242) have been processed. To do this without stopping new storage requests from being queued in the Store Array Queue or stopping the processing of existing entries in the Store Array Queue, a snapshot counter is loaded with the current total number of entries queued in the host memory pipeline. This snapshot counter is then decremented for every host memory response received. Then when the snapshot counter reaches zero, Firmware knows that all previous host memory store requests queued up in queues in memory pipeline locations for the ACW of interest have been processed. This function may be performed by the Global Store Quiesce hardware 312 which is made up of the following counters:

1. A Global Active Request Counter keeps track of the total number of HBA store requests for all ACWs queued in the host memory pipeline. This counter increments each time the data router Store hardware 232 generates a HBA store request to host memory and decrements each time the final host memory store request that completed the HBA store request is acknowledged as completed by the returned host memory response routed from the routing logic 242 to the data router control logic. In some embodiments, one HBA store request can require up to 16 host memory store requests to store all of the data in the HBA storage request.
2. A Global Active Snapshot Counter is only decremented and never incremented. This counter is loaded under control of Firmware with the current value of the Global Active Request Counter. This counter is decremented with the same signals that decrements the "Global Active Request Counter". Once this counter decrements to zero it stays at zero until loaded again by Firmware with a new copy of the Global Active Request Counter. Firmware can read the Global Active Snapshot Counter to determine when it has transitioned to zero.

The following procedure may be used by Firmware to stop an ACW that was previously set up to store data into host memory and then determine when all previous host memory requests for that ACW have completed:
1. Firmware sets the 'Firmware Read Discard' bit in each of the affected ACW to a one that was set up to store data into host memory;
2. Firmware transfers the Global Active Request Counter to the Global Active Snapshot Counter. Then as each host memory store request completes, the Global Active Snapshot Counter is decremented;
3. Firmware Polls the Global Active Snapshot Counter, until it reads zero. Now all host memory store requests made at the time Firmware transferring the Global Active Request Counter to the Global Active Snapshot Counter have completed for all of the ACWs of interest that had the Firmware Read Discard bit set to a one. No further host memory store requests will be made on behalf of these ACWs by the data router hardware.

In some instances, data from the HBA may be received by the data router hardware in a different order then the order the data was transmitted from the device. This poses a problem in that some types of Data Check Word calculations on received data must be calculated in the same data order the Data Check Word was originally generated when the data was transmitted. The data router hardware detects this condition with the use of the Next Expected 16 Meg Byte Offset field. As each HBA fetch or store request is processed, the data router hardware checks the PCIe 16 Meg Byte Offset in the HBA request against the Next Expected 16 Meg Byte Offset field in the ACW. If they match, the data router hardware will increment the Next Expected 16 Meg Byte Offset field by the HBA transaction size, move the data to or from host memory and process the Data Check Word. If the fields do not match and the HBA address is greater then the expected HBA address, then the current HBA transaction was received by the data router hardware out of order, and the data router hardware will re-queue this HBA request at the bottom of the Store or Fetch Array Queue.

The first time a HBA request is re-queued at the bottom of a queue, a timestamp is written in the control data for that HBA request. This control data is used to track the HBA request in the queue. Each time that frame 'bubbles' to the top of the queue for processing again and it must be re-queued because the HBA request with a matching 16 Meg Byte Offset field was not received, the timestamp is checked. If the timestamp exceeds a configurable 'Time To Live' (i.e., timeout period), the preceding frame(s) on which this HBA request was waiting are considered lost. When a lost frame condition is detected, the ACW Missing HBA Request (HPF-DR Response Word bit 8) is set to a one.

Out of order HBA requests for host memory stores may be handled as follows. Once the ACW Missing HBA Request bit is set to one, the payload for this HBA request is discarded, and the Read Discard bit 252 is also set to a one. This insures that all subsequent HBA requests with data to store in host memory for this ACW is discarded. However, any IU header information, if present, is always stored in the ACW and never discarded.

As each HBA request is discarded, the Active Request Count 290 is decremented in the ACW, exactly as is done when the HBA request is processed normally. The 16 Meg Byte Offset is not checked for HBA requests that are discarded. After Firmware receives the completion interrupt for this I/O operation from the HBA then Firmware checks to see if the Active Request Count 290 for this ACW has transitioned to zero. When the Active Request Count has transitioned to zero, all HBA requests in the Store Array Queue for this ACW have been processed.

For the cases where the 16 Meg Byte Offset 180 in the received HBA request to store data into host memory is less then the next expected 16 Meg Byte Offset 264, then this request is discarded because the data for this request had previously been stored in host memory. The Data Check Word will flag an error if the previous data stored in host memory was not correct because the data previously stored was used to calculate the current value of the Data Check Word in the ACW.

Out of order HBA requests for host memory Fetches may be handled as follows. Once the Missing HBA Request bit is set to one in a ACW, and the 'Time To Live' expired while waiting for the missing HBA fetch request, the data router hardware will respond to the HBA fetch request with a TLP Completion with the Completion Status set to Completer Abort and set the Write Drop bit 252 to a one in this ACW to insure that all subsequent HBA fetch requests received for this ACW will be responded to with a TLP Completion with the Completion Status set to Completer Abort.

For instances where the address in the received HBA request to fetch data from host memory is less then the next expected offset, then the data router hardware will respond to the request with a TLP Completion with the Completion Status set to Completer Abort.

Technical effects and benefits of exemplary embodiments include the ability of a network interface to directly access a host memory via a channel, while providing for the ability of the channel to store header information and provide error checking without the need to store input or output data at the channel. By allowing for direct addressing of the host memory, the systems and methods described herein allow high performance HBAs (e.g., that support link speeds at or above eight gigabits) to be installed without the need to redesign a store and forward channel model to provide microprocessor speeds and local channel memory bandwidths to support such high performance HBAs. They also provide the necessary isolation for error checking of a failed HBA that is currently provided. In addition, the systems and methods described herein allow for the use of HBAs that are only configured with one address space to address multiple address spaces in a host memory.

With this method of having the HBA directly addressing host memory the microprocessor performance and bandwidth requirement of the local channel memory does not have to be redesigned to meet increased performance requirements of new HBAs.

Other technical effects include providing a means to give an attached HBA the capability to access any address in any zone in host memory as well as an area in Local Channel Memory, providing a means to achieve the equivalent isolation of a HBA from the zSeries Host as exists for the current channel implementation, providing a means to for the channel to insert Information Unit (IU) Header information on an outgoing IU and remove and save IU Header information from an incoming IU locally in the channel as the Data Router is fetching or storing the data for the IU from or into host memory, providing a means to validate the Data Check Word on incoming data and generate and insert intermediate Data Check Words on the outgoing data, under control of a TIDAL, as well as at the end of outgoing data as the Data Router is storing or fetching data into or from host memory, providing a means to reorder requests received from a HBA if the HBA requests are not received from the HBA in the correct logical frame order and detect if a HBA request or frame is lost, providing a graceful means to terminate one I/O operation out of many that the data router may be working with, without disturbing any of the other active I/O operations, and providing a means to detect that an unrealistic but architectural valid Transport Indirect Data Address List is being used that requires excessive host memory requests to process therefore preventing the host memory request from being processed in a timely manner.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The invention claimed is:

1. A method of performing an input/output (I/O) processing operation at a host computer system configured for communication with a control unit, the method comprising:
   obtaining information relating to an I/O operation at a channel subsystem in the host computer system, the channel subsystem including at least one channel having a channel processor and a local channel memory;
   generating addressing information and forwarding the addressing information from the at least one channel to a network interface between the channel subsystem and at least one I/O device, the addressing information specifying a location in the local channel memory;
   forwarding an I/O command message to the at least one I/O device via the network interface;
   responsive to the I/O command message, receiving a data transfer request from the network interface that includes the addressing information;
   responsive to receiving the data transfer request, accessing one of a plurality of address control words (ACWs), each ACW specifying an address of a location in a host computer memory; and
   routing the data transfer request to the host memory location specified in the ACW.

2. The method of claim 1, wherein the addressing information includes one or more address control structures having an address field, each address control structure corresponding to a data transfer specified by the I/O operation, and forwarding the addressing information includes forwarding the one or more address control structures to the network interface prior to forwarding the I/O command message.

3. The method of claim 2, wherein the address field of the address control structure includes a control field (CTL), a first value in the CTL field indicating that the data transfer request is to be routed to a first region of the local channel memory, a second value in the CTL field indicating that the data transfer request is to be routed to a second region of the local channel memory, the first region being directly accessible by the network interface for local channel operations, the second region including the plurality of ACWs for use by a data router in the channel to address the host memory.

4. The method of claim 3, wherein the address field includes the CTL field having the second value, the address field including an ACW Index field that specifies one of a list of ACWs in the second region.

5. The method of claim 4, Wherein the I/O operation is a transport mode operation, and obtaining information includes obtaining a transport command word (TCW) at the channel subsystem, the TCW including a transport command control block (TCCB) address field including an address of a TCCB, the TCCB including a plurality of device command words (DCW) that each includes an I/O command.

6. The method of claim 5, wherein the plurality of ACWs includes a Transport Command ACW specifying an address of the TCCB in the host memory, a Transport Read ACW specifying an address of a location in the host memory for storage of input data received from the control unit via a data transfer request, a Transport Write ACW specifying an address of a location in the host memory for retrieval of output data for transmission to the control unit, and a Transport Status ACW specifying a location in the host memory for storage of an ending status sent by the control unit at a conclusion of the I/O operation.

7. The method of claim 6, wherein the one or more address control structures includes at least one of a Transport Command Address Control Structure specifying a location within the list of ACWs of the Transport Command ACW, one or more Transport Read Address Control Structures specifying a location within the list of ACWs of the Transport Read ACW, one or more Transport Write Address Control Structures specifying a location within the list of ACWs of the Transport Write ACW, and a Transport Ending Status Address Control Structure specifying a location within the list of ACWs of the Transport Status ACW.

8. The method of claim 1, wherein the network interface is a host bus adaptor (HBA).

* * * * *